United States Patent
Koike et al.

(10) Patent No.: US 9,044,916 B2
(45) Date of Patent: Jun. 2, 2015

(54) ELECTROSTATIC ADSORBABLE SHEET

(75) Inventors: Hiroshi Koike, Ibaraki (JP); Seiichiro Iida, Ibaraki (JP)

(73) Assignee: YUPO CORPORATION, Tokyo (JP)

( * ) Notice: Subject to any disclaimer, the term of this patent is extended or adjusted under 35 U.S.C. 154(b) by 58 days.

(21) Appl. No.: 12/968,439

(22) Filed: Dec. 15, 2010

(65) Prior Publication Data

US 2011/0143104 A1 Jun. 16, 2011

Related U.S. Application Data

(63) Continuation-in-part of application No. PCT/JP2009/060893, filed on Jun. 15, 2009.

(30) Foreign Application Priority Data

Jun. 16, 2008 (JP) ................................. 2008-156329
May 12, 2009 (JP) ................................. 2009-115076

(51) Int. Cl.
  *B41M 5/00* (2006.01)
  *B32B 7/02* (2006.01)
  (Continued)

(52) U.S. Cl.
  CPC ........... *B32B 7/06* (2013.01); *Y10T 428/24802* (2015.01); *Y10T 428/269* (2015.01); *G09F 3/04* (2013.01); *G09F 7/12* (2013.01)

(58) Field of Classification Search
  CPC .............. B32B 7/06; B32B 7/10; B32B 7/04; G09F 7/12; G09F 3/04
  USPC ......... 428/195.1, 187, 189, 40.1, 42.2, 411.1; 346/158; 283/117, 81; 347/105, 106
  See application file for complete search history.

(56) References Cited

U.S. PATENT DOCUMENTS 4,107,861 A * 8/1978 Johnson ..................... 40/654.01
5,437,917 A * 8/1995 Ohe et al. ................... 428/211.1
(Continued)

FOREIGN PATENT DOCUMENTS

JP 58098351 6/1983
JP 61000251 1/1986
(Continued)

OTHER PUBLICATIONS

Office Action issued with respect to patent family member Japanese Patent Application No. 2009-142980, mailed Feb. 5, 2013, and English-language translation thereof.
(Continued)

*Primary Examiner* — Mark Ruthkosky
*Assistant Examiner* — Laura C Powers
(74) *Attorney, Agent, or Firm* — Greenblum & Bernstein, P.L.C.

(57) ABSTRACT

An electrostatic adsorbable sheet (iii), which has a long-lasting adsorbability not easily affected by humidity, secures good ink adhesiveness, and does not generate troubles in a printing process, is provided. The electrostatic adsorbable sheet (iii) comprises a laminate of a label layer (i) containing a resin film layer (A) and a recording layer (D) on one surface of the resin film layer (A), and a peelable sheet layer (ii) containing a peelable layer (B) and a support layer (C), in which the label layer (i) and the peelable sheet layer (ii) are laminated so that the resin film layer (A) and the peelable layer (B) contact with each other. The peeling strength between the label layer (i) and the peelable sheet layer (ii) is from 1 to 50 g/cm, and the label layer (i) peeled from the peelable sheet layer (ii) is electrostatically adsorbable to an object to be attached.

20 Claims, 2 Drawing Sheets

(51) Int. Cl.
  *B32B 27/00* (2006.01)
  *B32B 7/06* (2006.01)
  *G09F 3/04* (2006.01)
  *G09F 7/12* (2006.01)

(56) References Cited

U.S. PATENT DOCUMENTS

| | | | |
|---|---|---|---|
| 5,904,985 A * | 5/1999 | Ward et al. | 428/32.1 |
| 6,595,632 B1 * | 7/2003 | Storfer-Isser et al. | 347/105 |
| 7,101,826 B2 * | 9/2006 | Iwasa et al. | 503/227 |
| 2001/0010861 A1 * | 8/2001 | Kirjavainen et al. | 428/343 |
| 2001/0024712 A1 | 9/2001 | Kirjavainen et al. | |
| 2005/0202239 A1 * | 9/2005 | Chu et al. | 428/355 CP |
| 2005/0238872 A1 * | 10/2005 | Kennedy et al. | 428/336 |
| 2007/0042144 A1 * | 2/2007 | Teensma et al. | 428/34.2 |
| 2010/0291363 A1 | 11/2010 | Koike et al. | |

FOREIGN PATENT DOCUMENTS

| | | |
|---|---|---|
| JP | 62-264950 | 11/1987 |
| JP | 62264950 | 11/1987 |
| JP | 63-030940 | 6/1988 |
| JP | 63030940 | 6/1988 |
| JP | 05-158418 | 6/1993 |
| JP | 06083266 | 3/1994 |
| JP | 07242054 | 9/1995 |
| JP | 07244461 | 9/1995 |
| JP | 10504248 | 4/1998 |
| JP | 3770926 | 2/2006 |
| WO | 92/00361 | 1/1992 |

OTHER PUBLICATIONS

Search Report issued with respect to patent family member European Patent Application No. 09766625.9, mailed Aug. 28, 2012.
Database WPI, Week 199330, Thompson Scientific, London, GB; AN 1993-237415, XP002681968, citing JP 5-158418.
China Office action, dated Dec. 24, 2013 along with an english translation thereof.
Japan Office action, dated Nov. 19, 2013 along with an english translation thereof.
Japan Office action, dated Nov. 26, 2013 along with an english translation thereof.
Office Action for Chinese Patent Application No. 200980122699.6, which is dated Jun. 4, 2014; along with an English translation thereof.
Decision of Rejection for Chinese Patent Application No. 200980122699.6, which was issued on Jan. 23, 2015; along with an English translation.

* cited by examiner

ELECTROSTATIC ADSORBABLE SHEET

PRIORITY

The present application is a continuation-in-part of International Application No. PCT/JP2009/060893, filed on Jun. 15, 2009, and claims the benefit of priority from Japanese Patent Application No. 2008-156329, filed on Jun. 16, 2008, and Japanese Patent Application No. 2009-115076, filed on May 12, 2009, the contents of which are herein incorporated by reference in their entireties.

FIELD OF THE INVENTION

The present invention relates to an electrostatic adsorbable sheet. A label layer (i) separated by peeling a peelable sheet layer (ii) from an electrostatic adsorbable sheet (iii) is an electrostatically-charged label having adsorbability for all types of objects to be attached, and capable of being readily peeled away after use. The electrostatic adsorbable sheet (iii) of the present invention has good handlability especially in a printing process, and is excellent in printing ink adhesiveness.

BACKGROUND

For attaching a printed poster, an advertisement or the like to an object to be attached, such as wall face, glass face, pillar, board, locker, bookshelf or the like, heretofore an adhesive agent, an adhesive tape or the like has been used. However, in case where a poster, an advertisement or the like is attached to an object to be attached with an adhesive agent or an adhesive tape, it is difficult to readily peel away after use, and there are some problems in that the paste may remain after peeling from the surface of the object to be attached or the coating on the surface of the object to be attached may peel away, therefore resulting in that the object may gradually get dirty or its original surface smoothness may be lost.

As a method of posting a poster, an advertisement or the like not using an adhesive agent or an adhesive tape, there is proposed an adsorption-type film that enables attaching by an electrostatic force. For example, Patent References 1 and 2 propose an electrostatic adsorbability-given polyvinyl chloride film; and Patent Reference 3 proposes an electrostatic adsorbability-given polypropylene film.

However, though a specific substance is incorporated in these films for keeping the electrostatic adsorbability, the films still have a problem in that their durability of the adsorbability is insufficient. In addition, as lacking in printability/recordability, these films have another problem in that, when they are used as posters or the like, a desired article must be attached thereto and then the films are used as an embodiment of posters or the like.

Patent References 4 to 6 propose a porous film of an electrostatically-adsorbable polymer. By making the film a porous film, the chargeable surface area becomes large, the ability to hold electrified charges is enhanced and the durability of the adsorbability is enhanced. However, the porous film is formed according to a coating method, and therefore the polymer usable for it is limited to a polymer soluble in a solvent. In addition, since the polymer has high moisture permeability and since the pores formed therein are not closed pores (but are interconnected), the film has defects in that the charge-retaining ability thereof varies depending on the external humidity and the electrostatic adsorbability thereof is influenced by humidity.

Patent Reference 7 proposes a film of a dielectric material that contains flat-shaped pores and has a high unipolar charge given to the inside thereof. The film produced according to the method has an advantage of high and long-lasting electrostatic adsorbability; however, when this is printed and is used as a poster or a label, there occur problems in that, in printing thereon, the runnability of the film on a printing machine is extremely bad because of its own electrostatic adsorbability and the film may stick to rolls and others thereby causing pattern misalignment or may catch dust and contaminants during printing and may thereby get dirty. To solve the problems, the formed film must be once printed, and then again given a unipolar charge; however, the process is complicated and is extremely inconvenient for use of the film as printing paper to be printed with various patterns. As such, originally, the film of Patent Reference 7 is not taken into consideration for printing, and is therefore defective in that the ink adhesiveness to it is insufficient.

RELATED ART REFERENCES

Patent References

Patent Reference 1: JP-B 63-030940
Patent Reference 2: JP-A 58-098351
Patent Reference 3: JP-A 61-000251
Patent Reference 4: JP-A 06-083266
Patent Reference 5: Japanese Patent No. 3770926
Patent Reference 6: JP-A 07-244461
Patent Reference 7: JP-T 10-504248

SUMMARY OF THE INVENTION

Problems that the Invention is to Solve

The electrostatic adsorbable sheet of the present invention has solved the problems with the conventional electrostatic adsorbable sheets that the electrostatic adsorbability thereof is low, the electrostatic adsorbability thereof is readily lowered by environmental influences, they are inconvenient for use as print recorded materials, and the printing ink adhesiveness is low.

Specifically, an object of the present invention is to provide an electrostatic adsorbable sheet (iii), which has a long-lasting adsorbability not easily affected by humidity, secures good ink adhesiveness thereto, and does not generate troubles in a printing process.

Means for Solving the Problems

In order to solve the problems, the present inventors have extensively studied and, as a result, have found that, when a laminate film having a specific structure is produced, then an electrostatic adsorbable sheet having the desired properties can be provided, and have completed the present invention.

Specifically, the present invention includes the following constitutions.

(1) An electrostatic adsorbable sheet (iii) comprising a laminate of a label layer (i) containing a resin film layer (A) and a recording layer (D) on one surface of the resin film layer (A), and a peelable sheet layer (ii) containing a peelable layer (B) and a support layer (C), in which the label layer (i) and the peelable sheet layer (ii) are laminated so that the resin film layer (A) and the peelable layer (B) contact with each other, wherein the peeling strength between the label layer (i) and the peelable sheet layer (ii) is from 1 to 50 g/cm, and the label layer (i) peeled from the peelable sheet layer (ii) is electrostatically adsorbable to an object to be attached.

(2) The electrostatic adsorbable sheet (iii) as described in (1) above, wherein the laminate in which the label layer (i) and the peelable sheet layer (ii) are laminated is subjected to an electrically charging treatment to introduce charges into the label layer (i).

(3) The electrostatic adsorbable sheet (iii) as described in (2) above, wherein the electrically charging treatment is a peeling charging derived from the peeling of the peelable sheet layer (ii) and the label layer (i).

(4) The electrostatic adsorbable sheet (iii) as described in (2) above, wherein the electrically charging treatment is a corona discharge treatment according to a high-voltage direct-current power source method.

(5) The electrostatic adsorbable sheet (iii) as described in (2) above, wherein the electrically charging treatment is a corona discharge treatment according to a high-voltage alternate-current power source method.

(6) The electrostatic adsorbable sheet (iii) as described in any of (1) to (5) above, wherein the resin film layer (A) contains from 3 to 70% by weight of at least one of an inorganic fine powder and an organic filler, and from 97 to 30% by weight of at least one of a polyolefin resin and a polyolefin resin having a functional group.

(7) The electrostatic adsorbable sheet (iii) as described in any of (1) to (6) above, wherein the resin film layer (A) contains a stretched resin film stretched in at least one axial direction and has a porosity, as computed according to the following formula (1), of from 1 to 70%.

[Numeral Formula 1]

$$\text{Porosity (\%)}=[(\rho_o-\rho)/\rho_o]\times 100 \quad (1)$$

(8) The electrostatic adsorbable sheet (iii) as described in any of (1) to (7) above, wherein the resin film layer (A) has a multilayer structure and contains a layer stretched in at least two axial directions.

(9) The electrostatic adsorbable sheet (iii) as described in any of (1) to (8) above, wherein the peelable layer (B) is formed according to a coating method from at least one of an ether resin, an ester resin, a urethane resin, a urea resin, an acrylic resin, an amide resin, and an epoxy resin.

(10) The electrostatic adsorbable sheet (iii) as described in any of (1) to (9) above, wherein the support layer (C) comprises any of a paper, a resin film or a synthetic paper.

(11) The electrostatic adsorbable sheet (iii) as described in any of (1) to (10) above, wherein the surface resistivity of the support layer (C) is from $1\times10^{-1}$ to $9\times10^{12}\Omega$.

(12) The electrostatic adsorbable sheet (iii) as described in any of (1) to (11) above, wherein the recording layer (D) contains a polymer binder.

(13) The electrostatic adsorbable sheet (iii) as described in any of (1) to (12) above, wherein the surface resistivity of the recording layer (D) is from $1\times10^{13}$ to $9\times10^{17}\Omega$.

(14) The electrostatic adsorbable sheet (iii) as described in any of (1) to (13) above, wherein the water vapor permeation coefficient of the label layer (i) is from 0.01 to 2.50 g·mm/(m²·24 hr).

(15) The electrostatic adsorbable sheet (iii) as described in any of (1) to (14) above, wherein the ratio of the Gurley softness of the peelable sheet layer (ii) is from 0.04 to 0.95 when the Gurley softness of the label layer (i) is set as 1.

(16) The electrostatic adsorbable sheet (iii) as described in any of (1) to (15) above, wherein the Gurley softness of the label layer (i) is from 5 to 1000 mgf, and the Gurley softness of the peelable sheet layer (ii) is from 1 to 500 mgf.

(17) The electrostatic adsorbable sheet (iii) as described in any of (1) to (16) above, wherein the thickness of the label layer (i) is from 20 to 500 μm, and the thickness of the peelable sheet layer (ii) is from 1 to 500 μm.

(18) A print recorded material comprising the electrostatic adsorbable sheet (iii) as described in any of (1) to (17) above.

(19) A label comprising the label layer (i) which is obtained by peeling the peelable sheet layer (ii) from the print recorded material as described in (18) above.

Preferably, the peelable sheet layer (ii) hardly blocks when the layers are put one upon another, and the blocking value thereof to be measured is preferably at most 20 g/cm.

The electrostatic adsorbable sheet (iii) of the present invention may be used as printing paper and is readily printed thereon, and the present invention therefore includes a print recorded material that contains the electrostatic adsorbable sheet (iii). The present invention also includes an embodiment of using the label layer (i) which is obtained by peeling the peelable sheet layer (ii) therefrom as a label.

Effect of the Invention

The present invention has made is possible to provide an electrostatic adsorbable sheet (iii), which has a long-lasting adsorbability not easily affected by humidity, secures good ink adhesiveness, and does not generate troubles in a printing process.

DESCRIPTION OF REFERENCE NUMERALS

Figure 1:
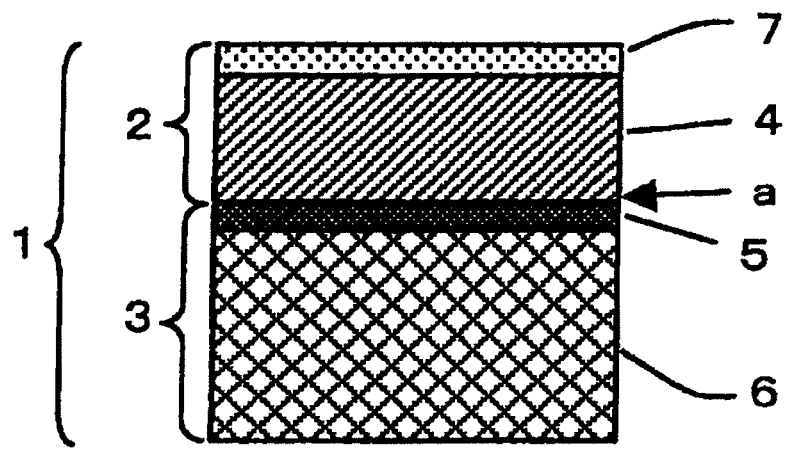
FIG. 1 It is a partly enlarged cross-sectional view of one embodiment of the electrostatic adsorbable sheet (iii) of the present invention.
Figure 2:
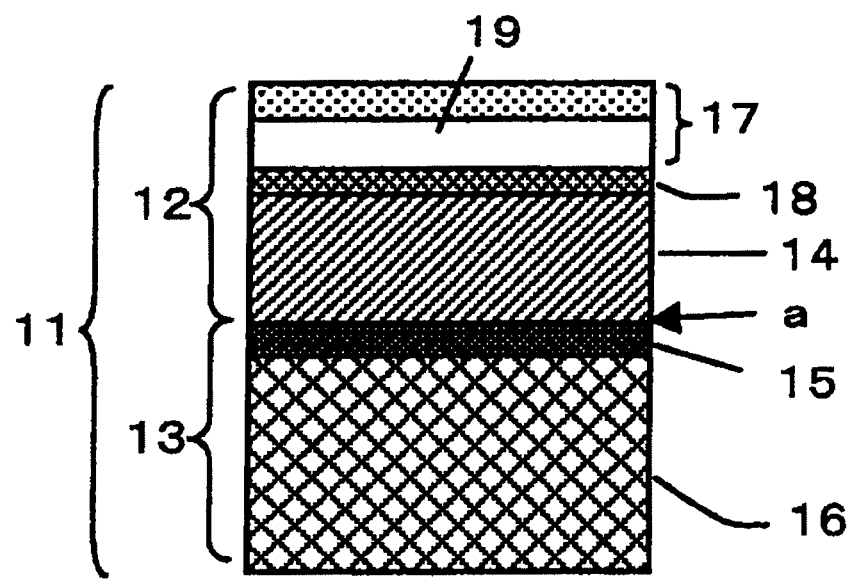
FIG. 2 It is a partly enlarged cross-sectional view of another embodiment of the electrostatic adsorbable sheet (iii) of the present invention.

1, 11 Electrostatic adsorbable sheet (iii)
2, 12 Label layer (i)
3, 13 Peelable sheet layer (ii)
4, 14 Resin film layer (A)
5, 15 Peelable layer (B)
6, 16 Support layer (C)
7, 17 Recording layer (D)
18 Film layer for forming recording layer
19 Adhesive layer for recording layer adhesion
a Peelable face
21 Electrostatic adsorbable sheet (iii)
22 Power source
23 Electrode
24 Earth electrode

MODE FOR CARRYING OUT THE INVENTION

The electrostatic adsorbable sheet (iii) of the present invention comprises a laminate of a label layer (i) containing a resin film layer (A) and a recording layer (D) on one surface of the resin film layer (A), and a peelable sheet layer (ii) containing a peelable layer (B) and a support layer (C), in which the label layer (i) and the peelable sheet layer (ii) are laminated so that the resin film layer (A) and the peelable layer (B) contact to each other, wherein the peeling strength between the label layer (i) and the peelable sheet layer (ii) is from 1 to 50 g/cm, and the label layer (i) peeled from the peelable sheet layer (ii) is electrostatically adsorbable to an object to be attached.

[Electrostatic Adsorption]

Electrostatic adsorption in the present invention is meant to indicate the condition such that the label layer (i) peeled from the peelable sheet layer (ii) attaches by an electrostatic force to an object to be attached, merely by contacting to the object to be attached in such a degree that the label layer (i) does not move down or does not drop down even though the object is stood vertical.

In order that the label layer (i) peeled from the peelable sheet layer (ii) is electrostatically adsorbable to an object to be attached, the laminate may be processed for charging treatment, though not specifically limited. More concretely, the charging treatment may be at least one treatment of (1) peeling charging treatment of the peeling of the peelable sheet layer (ii) and the label layer (i), and (2) charge injection treatment.

[Peeling Charging Treatment]

The electrostatic adsorbable sheet (iii) of the present invention can exhibit adsorbability by a peeling charging to occur when the label layer (i) and the peelable sheet layer (ii) are peeled from each other.

In particular, the adsorbability of the label layer (i) is exhibited by the charges accumulated on the surface and in the inside of the label layer (i). The adsorbability can be known roughly through surface potential measurement. As the surface potential measuring instrument, for example, "Keyence's high-precision electrostatic sensor SK" and "Trek Japan's high-voltage high-speed electrostatic voltmeter Model 341B", and the like are used. The measurement must be carried out in a given set circumstances so that it is not influenced by temperature and humidity. In addition, so as not to be influenced by the surrounding articles, the measurement is carried out in a condition such that the label layer (i) after the peelable sheet layer (ii) is peeled off is kept hanging in midair.

The surface potential varies depending on the material, the thickness and the density of the label layer (i) itself, and on the material of the peelable layer (B) and material of the support layer (C). In general, the relation of charge [C], capacitance [Q] and potential [V] is Q=CV; and even when the charge [C] is the same, the potential [V] is lower when the capacitance [Q] of the label layer (i) is higher.

The surface potential of the peeled label layer (i) of the present invention is generally from −1 to −30 KV in an environment at a temperature of 23° C. and a humidity of 50% RH. The surface potential of the same may be generally from 0 to −20 KV in an environment at a temperature of 40° C. and a humidity of 80% RH.

At a high humidity, the surface potential tends to be readily discharged from the surface of the label layer (i), and could be 0 KV in some cases; however, even when the label layer (i) is actually attached to a wall or the like in the same environment, it can exhibit a potent and long-lasting adsorbability. From this, it may be presumed that the adsorbability of the label layer (i) in the present invention would be greatly influenced not only by the charge of the surface of the label layer (i) but also by the charge inside of the label layer (i). In this case, the performance of the label layer (i) could not be sufficiently determined by the surface potential thereof alone; however, at present, since there is known no concrete technique or method capable of measuring the charges accumulated inside the label layer (i), the measurement of the charged level of the peeled label layer (i) in the present invention is unambiguously replaced by the measurement of the surface potential thereof.

The relationship between the potential and the adsorbability of the peeled label layer (i) above applies to the potential thereof after the charge injection treatment thereto mentioned below.

[Charge Injection Treatment]

In the present invention, preferably, after at least three layers, the resin film layer (A), the peelable layer (B) and the support layer (C), are laminated, the resulting laminate is processed for charge injection treatment thereto.

The charge injection treatment is not specifically limited, but may be carried out according to various known methods. For example, there are mentioned a method of forming the electrostatic adsorbable sheet and then applying corona discharge or pulsing high voltage to the surface of the film or applying direct-current high voltage to both surfaces of the film while both surfaces thereof are held with a dielectric material (electro-electret method), an electret method by irradiation with γ-rays or electron beams (radio-electret method), and the like.

The most preferred method of charge injection treatment in the present invention is corona discharge treatment.

One mode of corona discharge treatment is a high-voltage direct-current power source method which uses a voltage application electrode connected to a high-voltage direct-current power source and an earth electrode, and in which the electrostatic adsorbable sheet (iii) is fixed between the electrodes, or while it is led to pass between the electrodes, a voltage of from 5 to 100 kV is applied to the voltage application electrode to generate corona discharge, thereby introducing the charges into inside of the electrostatic adsorbable sheet (iii). In the method, as the voltage application electrode, plural metal needles arranged at regular intervals, or metal wires are used; and as the earth electrode, a flat metal plate or a metal roll is used. In the corona discharge treatment according to the high-voltage direct-current power source method, the charging polarity of the voltage application electrode may be any of plus or minus, and the polarity for easy charge accumulation in the label layer (i) may be selected. In general, in case where the voltage application electrode has a minus polarity, corona may be generated more efficiently and discharge spark tends to occur hardly; and therefore the case is preferred from the viewpoint of safety.

In the corona discharge treatment, when a high-voltage alternate-current power source is used in place of the high-voltage direct-current power source, the mode of the corona discharge treatment could be a high-voltage alternate-current power source method. Like the high-voltage direct-current power source method, the high-voltage alternate-current power source method enables charge injection into the label layer (i), in which, however, the ability of introducing the charges into inside of the label layer (i) is weak, as compared with that in the high-voltage direct-current power source method; and therefore, the high-voltage alternate-current power source method tends to be inferior to the high-voltage direct-current power source method as a charge injection treatment. In case where the high-voltage alternate-current power source method is employed, it is desirable that either of the voltage application electrode or the earth electrode is coated with an insulating material such as resin or ceramic to thereby increase the electrical insulation between the electrodes and to prevent generation of spark discharge.

The electrostatic adsorbable sheet (iii) of the present invention may be discharged after the charging treatment. The discharging treatment makes it possible to prevent troubles in a printing process or in a process for forming a label or the like. For the discharging treatment, usable is any known method using a voltage application charge neutralizer (ionizer), a self-discharge neutralizer or the like. Such ordinary dischargers may remove surface charges but could not remove the charges inside the resin film layer, especially those accumulated in the pores therein. Accordingly, the discharging treatment may lower the adsorbability of the label layer (i) but may not have any significant influence on the durability of the adsorbability.

The characteristics of the constitution of the products of the present invention are mentioned in more detail hereinunder.

[Label Layer (i)]

The label layer (i) comprises a resin film (A) and a recording layer (D). The thickness of the label layer (i) is preferably within a range of from 20 to 500 µm, more preferably from 25 to 400 µm, even more preferably from 27 to 300 µm, still more preferably from 30 to 200 µm. When the thickness of the label layer (i) is less than 20 µm, then the workability of the label layer (i) may worsen in handling it, since the layer may take charge and attached to a hand, etc. In addition, in some cases, the layer may readily shrink when attached to an object to be attached and its appearance may be thereby worsened. When thicker than 500 µm, then the self-weight of the label layer (i) may be too large and it would be difficult to keep the layer adsorbed to an object to be attached.

[Peelable Sheet Layer (ii)]

The peelable sheet layer (ii) comprises a peelable layer (B) and a support layer (C). The thickness of the peelable sheet layer (ii) is preferably within a range of from 1 to 500 µm, more preferably from 5 to 300 µm, even more preferably from 10 to 200 µm, still more preferably from 15 to 150 µm. In case where the thickness of the peelable sheet layer (ii) is less than 1 µm, then the peelable sheet layer (ii) may tend to break when the layer is peeled, and its function may be thereby degraded. When thicker than 500 µm, then the peelable sheet layer (ii) may have high stiffness and its rigidity may be too high; and if so, when the label layer (i) is peeled from this, the label layer (i) may shrink or the label layer (i) may curl, whereby the appearance of the label layer (i) may worsen and the label layer (i) could not be sufficiently charged by peeling and the durability of the adsorbability of the layer may be poor.

[Resin Film Layer (A)]

The resin film layer (A) in the present invention may have any constitution so far as it can exhibit the effect of the present invention, but preferably contains a thermoplastic resin. Also preferably, the layer has pores inside it thereby having a constitution of readily keeping charges therein.

The type of the thermoplastic resin for use in the resin film layer (A) is not specifically limited. For example, usable are polyolefin resins such as high-density polyethylene, middle-density polyethylene, low-density polyethylene, propylene resins, polymethyl-1-pentene; polyolefin resins having a functional group such as ethylene/vinyl acetate copolymer, ethylene/acrylic acid copolymer, maleic acid-modified polyethylene, maleic acid-modified polypropylene; polyamide resins such as nylon-6, nylon-6,6; thermoplastic polyester resins such as polyethylene terephthalate and copolymers thereof, polybutylene terephthalate, aliphatic polyesters; polycarbonates, atactic polystyrene, syndiotactic polystyrene, etc.

Of those thermoplastic resins, preferred are polyolefin resins and polyolefin resins having a functional group excellent in workability. It is known that a film mainly comprising a polyolefin resin has a weak adhesion power to an adhesive that is to be the peelable layer (B) to be mentioned below, and the film of the type facilitates good peeling at the interface between the resin film layer (A) and the peelable layer (B).

More specific examples of the polyolefin resins include homopolymers of olefins such as ethylene, propylene, butylene, butadiene, isoprene, chloroprene, methyl-1-pentene; and copolymers of two or more such olefins.

More specific examples of the polyolefin resins having a functional group include copolymers of the above-mentioned olefin and a copolymerizable, monomer having a functional group. Especially typically, the monomer having a functional group includes styrenes such as styrene, α-methylstyrene; vinyl carboxylates such as vinyl acetate, vinyl alcohol, vinyl propionate, vinyl butyrate, vinyl pivalate, vinyl caproate, vinyl laurate, vinyl stearate, vinyl benzoate, vinyl butylbenzoate, vinyl cyclohexanecarboxylate; acrylic acid, methacrylic acid; acrylates such as methyl(meth)acrylate, ethyl (meth)acrylate, butyl(meth)acrylate, hexyl(meth)acrylate, octyl(meth)acrylate, 2-ethylhexyl(meth)acrylate, stearyl (meth)acrylate, benzyl(meth)acrylate, cyclohexyl(meth) acrylate, isobornyl(meth)acrylate, dicyclopentanyl(meth) acrylate, (meth)acrylamide, N-methanol(meth)acrylamide; vinyl ethers such as methyl vinyl ether, ethyl vinyl ether, propyl vinyl ether, butyl vinyl ether, cyclopentyl vinyl ether, cyclohexyl vinyl ether, benzyl vinyl ether, phenyl vinyl ether. One or more of those monomers having a functional group may be suitably selected and copolymerized for use herein.

Further, if desired, these polyolefin resins and/or polyolefin resins having a functional group may be graft-modified for use herein.

Any known method may be employed for graft modification. One specific example is graft modification with an unsaturated carboxylic acid or its derivative. The unsaturated carboxylic acid includes, for example, acrylic acid, methacrylic acid, maleic acid, fumaric acid, itaconic acid, etc. As derivatives of the unsaturated carboxylic acids, herein usable are their acid anhydrides, esters, amides, imides, metal salts, etc. Concretely, there are mentioned maleic anhydride, itaconic anhydride, citraconic anhydride, methyl acrylate, ethyl acrylate, methyl methacrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate, diethyl itaconate, acrylamide, methacrylamide, maleic monoamide, maleic diamide, maleic-N-monoethylamide, maleic-N,N-diethylamide, maleic-N-monobutylamide, maleic-N,N-dibutylamide, fumaric monoamide, fumaric diamide, fumaric-N-monoethylamide, fumaric-N,N-diethylamide, fumaric-N-monobutylamide, fumaric-N,N-dibutylamide, maleimide, N-butylmaleimide, N-phenylmaleimide, sodium acylate, sodium methacrylate, potassium acrylate, potassium methacrylate, etc.

Graft-modified derivatives are those produced by generally from 0.005 to 10% by weight, preferably from 0.01 to 5% by weight graft-modifying a polyolefin resin or a polyolefin resin having a functional group with a graft monomer.

As the thermoplastic resin for use for forming the resin film layer (A), one may be selected from the above-mentioned thermoplastic resins for single use thereof or two or more may be selected from them for combined use thereof.

Of those polyolefin resins and/or polyolefin resins having a functional group, preferred are propylene resins from the viewpoint of the chemical resistance and the cost and the like. For the propylene resins, propylene homopolymers of isotactic or syndiotactic polypropylene, or those having a different degree of stereospecificity, or copolymers comprising propylene as the main ingredient and copolymerized with an α-olefin such as ethylene, 1-butene, 1-hexene, 1-heptene, 4-methyl-1-pentene or the like are preferably used as the main ingredient. The copolymers may be binary ones or ternary or more polynary ones, or may be random copolymers or block copolymers. Preferably, the propylene resin contains, as incorporated therein, a resin having a lower melting point than a propylene homopolymer in an amount of from 2 to 25% by weight. Examples of the resin having a lower melting point include high-density or low-density polyethylene.

The resin film layer (A) in the present invention preferably contains an inorganic fine powder and/or an organic filler. Addition of an inorganic fine powder and/or an organic filler and the stretching step to be mentioned below enable formation of pores inside the resin film layer (A).

In case where an inorganic fine powder is added, those generally having a particle size of from 0.01 to 15 µm, preferably from 0.1 to 5 µm are used. Concretely usable are calcium carbonate, calcined clay, silica, diatomaceous earth, white clay, talc, titanium oxide, barium sulfate, alumina, zeolite, mica, sericite, bentonite, sepiolite, vermiculite, dolomite, wollastonite, glass fibers, etc.

In case where an organic filler is added, preferably, a resin different from the thermoplastic resin of the main ingredient is selected. For example, in case where the thermoplastic resin film is a polyolefin resin film, polymers such as polyethylene terephthalate, polybutylene terephthalate, polycarbonate, nylon-6, nylon-6,6, cyclic olefin copolymer, polystyrene, polymethacrylate or the like, having a melting point (for example, 170 to 300° C.) or a glass transition temperature (for example, 170 to 280° C.) higher than the melting point of the polyolefin resin and immiscible with the polyolefin resin are usable as the organic filler.

Preferably, the resin film layer (A) contains an inorganic fine powder and/or an organic filler in an amount of from 3 to 70% by weight, and a polyolefin resin and/or a polyolefin resin having a functional group in an amount of from 97 to 30% by weight. More preferably, the resin film layer (A) contains an inorganic fine powder and/or an organic filler in an amount of from 5 to 50% by weight, and a polyolefin resin and/or a polyolefin resin having a functional group in an amount of from 95 to 50% by weight.

When the content ratio of the inorganic fine powder and/or the organic filler is less than 3% by weight, then the pore formation may be insufficient, and if so, since the ability of the film to accumulate charges inside it may be low, the durability of the adsorbability may be low, in some cases. On the other hand, when the content is more than 70% by weight, it is unfavorable since the film may have a structure of facilitating escape of charges owing to the formation of pores continuous with each other.

If desired, the resin film layer (A) may contain, as added thereto, a stabilizer (antioxidant), a light stabilizer, a dispersant, a lubricant, etc. In case where a stabilizer is added, its amount is generally within a range of from 0.001 to 1% by weight. Concretely, sterically-hindered phenol-type, phosphorus-containing, or amine-type stabilizers may be used. In case where a light stabilizer is added, its amount is generally within a range of from 0.001 to 1% by weight. Concretely, sterically-hindered amine or benzotriazole-type or benzophenone-type light stabilizers may be used. A dispersant and a lubricant are used, for example, for the purpose of dispersing an inorganic fine powder. Its amount to be used may be generally within a range of from 0.01 to 4% by weight. Concretely, silane coupling agents; higher fatty acids such as oleic acid, stearic acid; metal soap; polyacrylic acid, polymethacrylic acid or salts thereof, etc, may be used.

The thickness of the resin film layer (A) is generally within a range of from 20 to 500 µm, preferably from 30 to 400 µm. When thinner than 20 µm, then the workability of the resin film layer (A) may worsen in handling it by itself, since the layer may take charge and attach to a hand, etc. In some cases, in addition, the layer may readily shrink when attached to an object to be attached and its appearance may be thereby worsened. When thicker than 500 µm, then the self-weight of the resin film layer (A) may be too large and, in some cases, the layer could not sustain its self-weight by electrostatic force.

The resin film layer (A) may have a two-layer structure or a three-layer or more multilayer structure; and the multilayer structure may be stretched in a mode of monoaxial/monoaxial, monoaxial/biaxial, biaxial/monoaxial, monoaxial/monoaxial/biaxial, monoaxial/biaxial/monoaxial, biaxial/monoaxial/monoaxial, monoaxial/biaxial/biaxial, biaxial/biaxial/monoaxial or biaxial/biaxial/biaxial stretching. Such layer multiplicity of the resin film layer (A) enables addition thereto various functions such as writability, printability, thermal transferability, friction resistance, secondary workability, etc.

In particular, a multilayer structure comprising a biaxially-stretched layer having excellent chargeability and having tabular pores, and a monoaxially-stretched layer having high surface strength may tend to satisfy both improved chargeability and improved peelability.

[Multilayer Formation]

In case where the resin film layer (A) is formed to have a multilayer structure, various known methods may be employed for the formation. Concretely, there are mentioned a multilayer die method of using a feed block and a multi-manifold; an extrusion lamination method using plural dies, etc. The multilayer die method and the extrusion lamination method may be combined here.

[Stretching]

The resin film layer (A) may be stretched according to any of various known methods generally used in the art.

The stretching temperature may fall within a known temperature range favorable for the thermoplastic resin mainly constituting the resin film layer (A), which is within a range from the glass transition point of the resin to the melting point of the crystal part thereof. Concretely, in case where the thermoplastic resin of the resin film layer (A) is a propylene homopolymer (melting point, 155 to 167° C.), the stretching temperature may be from 100 to 166° C., and where the resin is a high-density polyethylene (melting point, 121 to 136° C.), the temperature may be from 70 to 135° C.; or that is, the stretching temperature may be lower by from 1 to 70° C. than the melting point of the resin. Preferably, the stretching speed is from 20 to 350 m/sec.

In case where a cast film is stretched, the stretching method includes longitudinal stretching based on the peripheral speed difference between rolls, lateral stretching with a tenter oven, rolling, simultaneous biaxial stretching with a tenter oven and a linear motor as combined, etc. The stretching method for an inflation film includes simultaneous biaxial stretching according to a tubular method.

Not specifically defined, the stretching ratio may be suitably determined in consideration of the properties of the thermoplastic resin used in the resin film layer (A) and the like. For example, in case where a propylene homopolymer or copolymer is used as the thermoplastic resin and when stretched in one direction, the stretching ratio may be from about 1.2 to 12 times, preferably from 2 to 10 times, but when stretched biaxially, the areal stretching ratio may be from 1.5 to 60 times, preferably from 4 to 50 times. In case where any other thermoplastic resin is used and when stretched in one direction, the stretching ratio may be from about 1.2 to 10 times, preferably from 2 to 5 times, but when stretched biaxially, the areal stretching ratio may be from 1.5 to 20 times, preferably from 4 to 12 times.

Preferably, the stretched film thus produced has a large number of fine pores inside the film, having a porosity, as computed according to the formula (1) mentioned below, of from 1 to 70%, more preferably from 10 to 45%. Having pores therein, the number of interfaces in the resin film may increase and the film could hold charges with ease inside it; and as compared with that of a resin film not having pores therein, the ability of the film to accumulate charges inside it is enhanced, and the adsorbability thereof lowers little even in a high-humidity environment.

[Numeral Formula 2]

$$\text{Porosity (\%)}=[(\rho_o-\rho)/\rho_o]\times100 \quad (1)$$

[Support Layer (C)]

The support layer (C) in the present invention is for reinforcing the peelable layer (B) so as to protect the peelable layer (B) from breakage or cohesion failure in peeling the peelable layer (B) from the resin film layer (A).

As the support layer (C), any known paper, resin film, synthetic paper or the like is usable and may be suitably selected depending on the compatibility thereof with the peelable layer (B). Preferably, the support layer (C) has excellent adhesiveness to the peelable layer (B). In case where a hardly adhering material such as a polyolefin film or the like is used as the support layer (C), preferably, the adhesiveness of the material is enhanced through corona discharge surface treatment, flame plasma treatment, atmospheric plasma treatment or the like.

The thickness of the support layer (C) is preferably from 1 to 500 μm, more preferably from 5 to 300 μm, even more preferably from 10 to 200 μm, still more preferably from 15 to 150 μm.

When the thickness of the support layer (C) is less than 1 μm, then the peelable sheet layer (ii) may readily break, and the peelability of the peelable sheet layer (ii) may be poor. When thicker than 500 μm, then the peelable sheet layer (ii) may have high stiffness and its rigidity may be too high; and if so, when the label layer (i) is peeled from this, the label layer (i) may shrink or the label layer (i) may curl, whereby the appearance of the label layer (i) may worsen and the label layer (i) could not be sufficiently charged by peeling and the durability of the adsorbability of the layer may be poor.

[Peelable Layer (B)]

For the peelable layer (B) in the present invention, any known adhesive may be suitably used, which weakly adheres to the resin film layer (A) and which has excellent adhesiveness to the support layer (C). For securing the peelability thereof from the adhesive, the surface of the resin film layer (A) to be in contact with the peelable layer (B) is preferably one not processed for corona surface treatment or the like.

The electrostatic adsorbable sheet (iii) is formed of the above-mentioned resin film layer (A) and support layer (C), for which the peelable layer (B) is used for bonding the two, and the two are laminated via it. The bonding may be attained according to an ordinary method of dry lamination or melt lamination of using a hot melt film or a melt extrusion film, via an adhesive such as a solvent-based adhesive or a hot-melt adhesive applied onto the resin film layer (A) or the support layer (C) by coating, spraying, melt extrusion lamination or the like to provide the peelable layer (B) thereon.

As the adhesive for dry lamination, typically mentioned is a flowable and coatable, solution-type or emulsion-type liquid adhesive that is prepared by dissolving, dispersing, emulsifying and dispersing, or diluting a resin component of an ether resin, an ester resin, a urethane resin, a urea resin, an acrylic resin, an amide resin, an epoxy resin or the like in a phase of a conventional known solvent.

Examples of the ether resin include polyether polyols produced by polymerization of an oxirane compound such as ethylene oxide, propylene oxide, butylene oxide, tetrahydrofuran or the like, using, as an initiator, water or a low-molecular weight polyol such as propylene glycol, ethylene glycol, glycerin, trimethylolpropane, bisphenol A, ethylenediamine or the like; more concretely polypropylene glycol, polyethylene glycol, polytetramethylene glycol, etc.

Examples of the ester resin include dehydration reaction products of a polybasic acid and a polyalcohol. The polybasic acid includes isophthalic acid, terephthalic acid, phthalic anhydride, dimethyl isophthalate, dimethyl terephthalate, adipic acid, azelaic acid, sebacic acid, glutaric acid, hexahydrophthalic anhydride, etc.; and one or more of these may be used here. The polyalcohol includes ethylene glycol, diethylene glycol, triethylene glycol, trimethylolpropane, propylene glycol, dipropylene glycol, 1,6-hexanediol, neopentyl glycol, hydrogenated bisphenol A, 1,4-butanediol, 1,4-cyclohexanedimethanol, 2,2,4-trimethylpentane-1,3-diol, polyethylene glycol, etc.; and one or more of these may be used here for polymerization.

Examples of the urethane resin include condensation products of the above-mentioned polyalcohol, ether resin and/or ester resin and an isocyanate compound. For example, there may be mentioned aliphatic isocyanates such as hexamethylene diisocyanate, 2,4-methylcyclohexane diisocyanate, cyclobutane diisocyanate, tetramethylene diisocyanate, o-, m- or p-xylylene diisocyanate, hydrogenated xylylene diisocyanate, dicyclohexylmethane diisocyanate, dimethyldicyclohexylmethane diisocyanate, lysine diisocyanate, cyclohexane diisocyanate, dodecane diisocyanate, tetramethylxylylene diisocyanate, isophorone diisocyanate; aromatic isocyanates such as tolylene 2,4-diisocyanate, tolylene 2,6-diisocyanate, diphenylmethane 4,4'-diisocyanate, 3-methyldiphenylmethane 4,4'-diisocyanate, m- or p-phenylene diisocyanate, chlorophenylene 2,4-diisocyanate, naphthalene 1,5-diisocyanate, diphenyl 4,4'-diisocyanate, 3,3'-dimethyldiphenyl-1,3,5-triisopropylbenzene-2,4-diisocyanate, carbodiimide-modified diphenylmethane diisocyanate, polyphenylpolymethylene polyisocyanate; isocyanate monomers such as diphenyl ether diisocyanate, etc. As the isocyanate compound, also usable are polyisocyanate compounds modified with a polyalcohol for increasing the molecular weight thereof and for imparting thereto various properties such as adhesiveness, stability, etc.

Examples of the urea resin include condensates of an amine compound and the above-mentioned isocyanate compound. Examples of the amine compound include aliphatic amines such as ethylenediamine, 1,2-propylenediamine, 1,3-propylenediamine, 1,4-butanediamine, hexamethylenediamine, diethylenetriamine, triethylenetetramine, tetraethylenepentamine; alicyclic polyamines such as isophoronediamine, dicyclohexylmethanediamine, methylcyclohexanediamine, isopropylidene-bis-4-cyclohexyldiamine, 1,4-cyclohexanediamine; heterocyclic amines such as piperazine, methylpiperazine, aminoethylpiperazine.

Examples of the acrylic resin are typically those through polymerization of an acrylic compound with an organic peroxide serving as a polymerization initiator. Specific examples of the acrylic compound include (meth)acrylic acid, methyl (meth)acrylate, ethyl(meth)acrylate, n-propyl(meth)acrylate, n-butyl(meth)acrylate, t-butyl(meth)acrylate, cyclohexyl (meth)acrylate, 2-ethylhexyl(meth)acrylate, lauryl(meth) acrylate, tridecyl(meth)acrylate, stearyl(meth)acrylate, 2-hydroxyethyl(meth)acrylate, 2-hydroxypropyl(meth)acrylate, (meth)acrylonitrile, (meth)acrylamide, glycidyl(meth)acrylate, etc. One or more of these may be used either singly or as combined for polymerization.

Examples of the amide resin include condensates of an amine compound and a polybasic acid. As the amine compound and the polybasic compound, the above-mentioned compounds may be used.

Examples of the epoxy resin include those produced through homocondensation of a polyglycidyl ether prepared through reaction of a polyphenol and an epihalohydrin and/or a low-molecular epoxy compound; and those produced through condensation reaction with the above-mentioned ether resin, ester resin, urethane resin, urea resin, acrylic resin or amide resin. Specific examples of the polyphenol include bisphenols such as bisphenol A (2,2-bis(4-hydroxyphenyl)propane), bisphenol B (2,2-bis(4-hydroxyphenyl)butane), bisphenol E (2,2-bis(4-hydroxyphenyl)ethane), bisphenol S (2,2-bis(4-hydroxyphenyl)sulfone), 2,2-bis(4-hydroxyphenyl)-4-methylpentane, 1,1-bis(4-hydroxyphenyl)-2-methylpropane, bis(4-hydroxyphenyl)phenylmethane, 2,2-bis(4-hydroxy-3,5-dimethylphenyl)methane, 2,2-bis(4-hydroxy-3,5-dimethylphenyl)ethane, 2,2-bis(4-hydroxy-3,5-dimethylphenyl)propane, 2,2-bis(4-hydroxy-3,5-dimethylphenyl)butane, 2,2-bis(4-hydroxy-3-methylphenyl)butane, 2,2-bis(4-hydroxy-3-methylphenyl)-2-phenylethane, bisphenol, bis(4-hydroxyphenyl)ether, bis(4-hydroxyphenyl)ketone.

Formation of the peelable layer (B) by coating may be attained with a die coater, a bar coater, a comma coater, a lip coater, a roll coater, a rod coater, a curtain coater, a gravure coater, a spray coater, a blade coater, a reverse coater, an air knife coater, a slide hopper, etc. If desired, smoothing is carried out thereafter, and the drying step is applied to form the peelable layer (B).

The peelable layer (B) is formed by coating so that its thickness after dried is preferably from 0.1 to 100 µm, more preferably from 0.2 to 50 µm, even more preferably from 0.5 to 25 µm. When thinner than 0.1 µm, the peelable layer (B) may be partly lost and the charging of the label layer (i) may be insufficient. On the other hand, when thicker than 100 µm, the peelable layer (B) may be unevenly dried and cured inside it and therefore the peelable layer (B) may be often broken inside it, and if so, the label layer (i) alone could not be peeled.

For forming the peelable layer (B) by coating, the adhesive is applied onto the surface of the resin film layer (A) by coating, and then the support layer (C) is superposed thereon and attached together by pressure with a pressure roll; or the adhesive is applied onto the back of the support layer (C) by coating, and then the resin film layer (A) is superposed thereon and attached together by pressure with a pressure roll.

Examples of the hot-melt adhesive include polyolefin resins such as low-density polyethylene, ethylene/vinyl acetate copolymer, metal salt of ethylene/(meth)acrylic acid copolymer (so-called Surlyn), chlorinated polyethylene, chlorinated polypropylene; polyamide resins, polybutyral resins, urethane resins, etc.

In case where a hot-melt adhesive is used, it is applied onto the surface of the resin film layer (A) by bead coating, curtain coating, slot coating or the like, and then the support layer (C) is superposed thereon and attached together by pressure with a pressure roll; or the adhesive is extruded out in a melt film form onto the surface of the support layer (C) through a die and laminated thereon, and then the resin film layer (A) of a synthetic resin film is superposed and attached together by pressure with a pressure roll.

Preferably, the peelable layer (B) is one that is readily peeled from the resin film layer (A) and readily secures peeling charging between it and the resin film layer (A) in peeling it. In particular, in case where a polyolefin resin in which the polar component is small is used for the resin film layer (A), by using a high-polar resin component for the peelable layer (B), the resin film layer (A) may be readily peeled and may be highly electrically charged. It has been known through the ages that contact of resins differing in the polarity makes the resins have static charges, which is described in, for example, "Static Electricity Handbook" (edited by the Society of Static Electricity of Japan, pp. 1025-1029). For the method of forming such a high-polarity resin peelable layer (B), dry lamination of forming the peelable layer (B) by coating is suitable.

It is necessary that the adhering force of the peelable layer (B) is low. In order to readily pinch the label layer (i) of the electrostatic adsorbable sheet (iii) of the present invention, the label layer (i) may be partly torn away and the unnecessary label layer (i) may be removed with the peelable sheet layer (ii) alone kept remaining as such; however, in case where the adhesiveness of the peelable layer (B) is high, then the part of the sheet from which the label layer (i) has been removed would be blocked and the sheet could not exhibit the initial performance of the present invention. For reducing the adhering force of the peelable layer (B) and for preventing the blocking, preferably, a crosslinking agent is used for the peelable layer (B). The crosslinking agent to be used for the peelable layer (B) includes the above-mentioned isocyanate compounds and derivatives thereof; NCO-terminated, polycondensed urethane resin isocyanates produced through reaction of the above-mentioned polyalcohol, ether resin or ester resin and the isocyanate compound; polyglycidyl ethers and derivatives thereof; melamine resins, etc. In particular, crosslinking with an isocyanate compound and a urethane resin-type isocyanate is possible even at room temperature, not requiring heat treatment, and is therefore especially favorable as not causing thermal deformation of the electrostatic adsorbable sheet (iii).

The amount of the crosslinking agent to be added to the peelable layer (B) may be suitably determined depending on the peeling strength of the label layer (i) and on the degree of blocking of the peelable sheet (ii). The isocyanate compound and the urethane resin-type isocyanate may condense alone, and when the amount of the crosslinking agent to be added is increased, then both the peeling strength and the degree of blocking tend to lower.

A lubricant and an inorganic and/or organic fine powder may be added to the peelable layer (B) for the purpose of controlling the peelability thereof from the resin film layer (A). Examples of the lubricant include alcohol lubricants such as cetyl alcohol, stearyl alcohol, polyethylene glycol; fatty acid lubricants such as stearic acid, erucic acid, behenic acid; fatty acid ester lubricants such as ethyl palmitate, butyl stearate, stearyl stearate; fatty acid metal salt lubricants such as calcium stearate, zinc stearate, lithium hydroxystearate; fatty acid amide lubricants such as lauramide, palmitamide, stearamide, oleamide; wax lubricants such as paraffin wax, low-molecular weight polyethylene, low-molecular weight polypropylene, montan wax, carnauba wax, bee wax, privet tallow, etc. Examples of the inorganic fine powder include calcium carbonate, calcined clay, silica, diatomaceous earth, talc, titanium oxide, barium sulfate, alumina, etc. Examples of the organic fine powder include resin particles of polyacrylic acid, polymethacrylic acid, dimethylpolysiloxane, polytetrafluoroethylene, etc.

[Recording Layer (D)]

A recording layer (D) is provided on at least one surface of the resin film layer (A) of the electrostatic adsorbable sheet (iii) of the present invention, for the purpose of enhancing the adhesiveness with a printing ink.

For the printing, employable is any known method of offset printing, gravure printing, flexographic printing, letter press printing, screen printing, inkjet recording, thermal recording, thermal transfer recording, electrophotographic recording, etc. From the viewpoint of the printing accuracy and the applicability to small-lot production, preferred is any of offset printing, letter press printing, flexographic printing, screen printing. As the printing ink, employable is oily ink or UV ink, but preferred is UV ink from the viewpoint of the friction resistance thereof.

From the above, the recording layer (D) preferably contains a polymer binder. More preferred is a coating layer comprising from 40 to 100% by weight of a polymer binder and from 0 to 60% by weight of an inorganic fine powder. Even more preferably, the layer comprises from 50 to 90% by weight of a polymer binder and from 10 to 50% by weight of an inorganic fine powder. Providing the recording layer (D) having the same composition as that of UV ink enhances the UV ink adhesiveness to the layer.

Regarding the method of providing the recording layer (D) on the resin film layer (A), the layer may be directly formed on the resin film layer (A) by coating, or the recording layer (D) may be previously provided on a different film and then may be laminated on the resin film layer (A).

As the polymer binder, one having adhesiveness to the resin film layer (A) as a substrate and selected for the purpose of enhancing the adhesiveness of ink such as UV ink thereto is used.

Specific examples of the polymer binder include polyethyleneimine polymers such as polyethyleneimine, polyethyleneimine modified with alkyl having from 1 to 12 carbon atoms, poly(ethyleneimine-urea) and polyamine polyamide ethyleneimine adduct, polyamine polyamide epichlorohydrin adduct; acrylate polymers such as acrylamide-acrylate copolymer, acrylamide-acrylate-methacrylate copolymer, polyacrylamide derivative, oxazoline group-having acrylate polymer; polyvinyl pyrrolidone, polyethylene glycol, etc.; and additionally organic solvent-diluted resins or water-diluted resins of polyvinyl acetate, polyurethane, ethylene-vinyl acetate copolymer, polyvinylidene chloride, chlorinated polypropylene, acrylonitrile-butadiene copolymer, polyester, etc. Of those, preferred are polyethyleneimine polymers and polyurethanes, and polyacrylate copolymers.

As the inorganic fine powder, suitably used is any of calcium carbonate, calcined clay, titanium oxide, barium sulfate, silica, diatomaceous earth, etc.

In case where the recording layer (D) is provided on the resin film layer (A) by lamination, preferably, any other film with a recording layer formed thereon is prepared, and then it is laminated on the resin film layer (A).

The thickness of the recording layer (3) is preferably from 0.01 to 50 μm, more preferably from 0.02 to 30 μm. When thinner than 0.01 μm, the recording layer (D) could hardly secure uniformity and ink adhesiveness thereto may partly worsen. On the other hand, when thicker than 50 μm, then the printing layer may be heavy and the absorbability by static electricity of the resin film layer (A) could not support the self-weight thereof and, as a result, the layer may peel off and could not attain the intended performance of the present invention.

[Gurley Stiffness]

In the present invention, the Gurley stiffness is measured in each of MD and TD in an environment at a temperature of 23° C. and a humidity of 50% RH, according to JAPAN TAPPI No. 40:2000. The Gurley stiffness of the label layer (i) in the present invention is preferably from 5 to 1000 mgf, more preferably from 5 to 700 mgf, even more preferably from 5 to 400 mgf; and the Gurley stiffness of the peelable sheet layer (ii) is preferably from 1 to 500 mgf, more preferably from 1 to 300 mgf, even more preferably from 1 to 200 mgf. Preferably, the ratio of the Gurley stiffness of the peelable sheet layer (ii) to that of the label layer (i) is from 0.04 to 0.95 times, more preferably from 0.05 to 0.90 times. When the Gurley stiffness of the label layer (i) is less than 5 mgf, then the layer may have low stiffness and may be difficult to handle as a label, and in addition, it may readily shrink to worsen its appearance. When more than 1000 mgf, then the layer may have high stiffness and could not uniformly attach to an object to be attached with electrostatic adsorption with weak adsorbability if it curls a little, and as a result, the durability of the adsorbability may be poor. When the Gurley softness stiffness of the peelable sheet (ii) is less than 1 mgf, then the peelable sheet (ii) could hardly be pinched, and a notch could hardly be formed therein in peeling the label layer (i) from it. When more than 500 mgf, the label layer (i) may deform in peeling, and the label layer (i) may curl or shrink, and its function as a label may be thereby worsened. When the ratio of the Gurley stiffness of the peelable sheet layer (ii) to that of the label layer (i) is less than 0.04 times, then the peeling angle of the peelable sheet (ii) may be too large in peeling the label layer (i) and the peelable sheet layer (ii) and the peeling could not be attained stably, and if so, the label layer (i) may tend to scar easily in peeling and its appearance may be thereby worsened. On the other hand, when the ratio is more than 0.95 times, then the peeling angle of the label layer (i) may be too large in peeling the label layer (i) and the peelable sheet layer (ii), and if so, the peeled label layer (i) may curl or may shrink, and may therefore lose its function as a label.

[Surface Resistivity]

In the present invention, in case where the surface resistivity value is at least $1 \times 10^7 \Omega$ under the condition at 23° C. and at a relative humidity of 50%, the surface resistivity is measured using an electrode of a double ring method according to JIS-K-6911.

The surface resistivity of the recording layer (D) of the electrostatic adsorbable sheet (iii) of the present invention is preferably from $1 \times 10^{13}$ to $9 \times 10^{17} \Omega$, more preferably from $1 \times 10^{13}$ to $9 \times 10^{15} \Omega$. When the surface resistivity of the recording layer (D) is less than $1 \times 10^{13} \Omega$, then the static electricity may be readily peeled from the surface of the label layer (i) and the durability of the adsorbability of the layer may be poor, in some cases. When more than $9 \times 10^{17} \Omega$, the surface tension tends to be low and good ink adhesiveness is not attained, and therefore could not attain the intended performance of the present invention.

Preferably, the surface resistivity of the support layer (C) is from $1 \times 10^{-1}$ to $9 \times 10^{15} \Omega$, more preferably from $1 \times 10^6$ to $9 \times 10^{12} \Omega$ and particularly preferably, from $1 \times 10^9$ to $5 \times 10^{12} \Omega$. When the surface resistivity of the support layer (C) is less than $1 \times 10^{-1} \Omega$, then electric charges may readily escape from the label layer (i) after charge introduction into the electrostatic adsorbable sheet (iii) or in peeling the label layer (i) and the peelable sheet layer (ii), and therefore the durability of the adsorbability of the label layer (i) may worsen. On the contrary, when the surface resistivity of the support layer (C) is more than $9 \times 10^{15} \Omega$, then the electrostatic adsorbable sheet (iii) may be electrically charged by itself, and, if so, the paper alignment in printing may be difficult.

[Water Contact Angle]

In the present invention, the contact angle with water is obtained by measuring the contact angle with ion-exchanged water, using a contact angle meter (Kyowa Interface Science's Model CA-D) under the condition at 23° C. and at a relative humidity of 50%.

The contact angle with water of the recording layer (D) in the present invention is preferably within a range of from 50 to 110 degrees, more preferably from 60 to 100 degrees, even more preferably from 70 to 90 degrees. When the contact angle with water of the recording layer (D) is more than 110 degrees, then ink adhesiveness is hardly attained and the printing may tend to peel easily. On the other hand, when less than 50 degrees, the layer may have good compatibility with water and may absorb moisture in the air and, if so, the chargeability may lower in a high-humidity condition and the sheet could not secure the adsorbability.

[Blocking]

The peelable sheet layer (ii) is peeled from the electrostatic adsorbable sheet (iii), cut into a size having a width of 150 mm and a length of 200 mm, stored in a thermostat chamber (temperature of 23° C., relative humidity of 50%) for at least 12 hours. Then two such peelable sheet layers (ii) are put one upon another in such a manner that the support layer (C) of one sheet could face the peelable layer (B) of the other sheet and kept under a pressure of 10 MPa for 5 minutes. This is then cut into a size having a width of 10 mm and a length of 150 mm; and using a tensile tester (Shimadzu's AUTOGRAPH), the peelable sheets (ii) are peeled at a peeling angle of 180° at a tension rate of 300 mm/min. The stable tension is measured with a load cell. The blocking of the peelable sheet (ii) in the present invention is preferably at most 20 g/cm, more preferably at most 15 g/cm, even more preferably at most 10 g/cm. When the blocking is more than 20 g/cm, then the electrostatic adsorbable sheets (iii) may attach to each other when the label layer (i) is partly cut off and the unnecessary label layer (i) is removed with the peelable sheet layer (ii) alone kept remaining as such in order that the label layer (i) could be easily pinched, and, if so, the layer may lose its function as a label.

[Water Vapor Permeation Coefficient]

Measured at 40° C. and 90% RH by a cup method according to JIS-Z-0208. From the obtained data of the moisture permeability (g/(m$^2$·24 hr)) and the film thickness (mm), the water vapor permeability coefficient (g·mm/(m$^2$·24 hr)) is determined.

The water vapor permeability coefficient of the label layer (i) of the electrostatic adsorbable sheet (iii) of the present invention is preferably within a range of from 0.01 to 2.50, more preferably from 0.02 to 1.50, even more preferably from 0.05 to 1.00, still more preferably from 0.10 to 0.70. When the water vapor permeability coefficient is more than 2.50, then the electric chargeability in a high-humidity condition may greatly lower and the film adsorbability may greatly lower, and if so, the sheet could not attain the intended performance of the present invention as a label. On the other hand, in order to produce the label layer (i) having a water vapor permeability of less than 0.01, a special resin must be used for the resin film layer (A), which, however, is technically difficult and is poorly realizable.

[Peeling Strength]

The electrostatic adsorbable sheet (iii) is stored in a thermostat chamber (temperature of 23° C., relative humidity of 50%) for at least 12 hours, and then cut into a size having a width of 10 mm and a length of 150 mm. Then the resin film layer (A) is peeled from the peelable layer (B) to a half of the sample length. Using a tensile tester (Shimadzu's AUTOGRAPH), the label layer (i) is peeled from the peelable sheet layer (ii) at an angle of 180° at a tension rate of 300 mm/min, and the stable tension is measured with a load cell. The peeling strength in the present invention is from 1 to 50 g/cm, preferably from 1 to 30 g/cm, more preferably from 1 to 20 g/cm, even more preferably from 2 to 10 g/cm. When the peeling strength is less than 1 g/cm, the sheet may be defective in that peeling may occur during the process of secondary working such as pattern printing, letter printing, cutting or the like. When more than 50 g/cm-width, the label layer (i) alone could not be peeled, or the peeled label layer (i) may curl or the label layer (i) may shrink by peeling, and its appearance may be thereby worsened.

[Object to be Attached]

In the present invention, the object to be attached includes window, wall, ceiling, floor, pillar, signboard, partition board, locker, bookshelf, TV, refrigerator, washing machine, personal computer, car, etc. Their materials are not specifically defined. Concretely, they may be formed of metal, plastic, glass, wood, concrete, stone, cloth, etc. Of those, preferred are metal, glass and concrete from the viewpoint of easy adsorbability.

[Print Recorded Material]

The print recorded material for which the electrostatic adsorbable sheet (iii) of the present invention is used includes POP cards (poster, sticker, display, etc.), retail premises guides (pamphlet, company guide, list of goods, menu, etc.), mats (lunch mat, table mat, stationery, etc.), manuals (various manuals for duty assignment, work, operation, etc., process sheet, time schedule, etc.), charts (marine chart, weather map, graphic chart, ruled chart, etc.), catalogues, maps (marine map, route map, outdoor map, etc.), shop price lists, mountain climbing guides, visiting cards, lost child ID cards, cooking recipes, signboards (shop guide, direction/destination guide, etc.), schedule tables, road signs (for funeral/housing exhibition place, etc.), room identification cards, school record tables, signboards (for keep out, forest road construction, etc.), compartment piles, doorplates, calendars (with image), simple whiteboards, mouse pads, packaging materials (packaging paper, box, bag, etc.), coasters, etc., and the sheet is applicable to any of these. In particular, the sheet is favorable to indoor applications.

EXAMPLES

The present invention is described more specifically below with reference to Examples, Comparative Examples and Test Examples.

The material used, its amount and ratio, and the treatment process mentioned below may be suitably modified or changed not overstepping the sprit and the scope of the present invention. Accordingly, the scope of the present invention should not be limited by the specific examples mentioned below. Unless otherwise specifically indicated, "%" mentioned below is % by weight.

Thermoplastic resins used in Production Examples for the resin film layer (A) in the present invention are shown collectively in Table 1.

TABLE 1

| Material | Content |
|---|---|
| Thermoplastic Resin (a) | Thermoplastic resin composition prepared by incorporating 10% by weight of calcium carbonate [Shiraishi Calcium's Softon 1800] (mean particle size = 1.2 μm) in a mixture of 80% by weight of propylene homopolymer [Japan Polychem's Novatec PP:FY4] (MFR (230° C., 2.16 kg load) = 5 g/10 min, melting point = 165° C.) and 10% by weight of high-density polyethylene [Japan Polychem's Novatec HD:HJ360] (MFR (190° C., 2.16 kg load) = 5 g/10 min, melting point = 131° C.), followed by kneading the resulting composition in an extruder set at a temperature of 230° C. |
| Thermoplastic Resin (b) | Thermoplastic resin composition prepared by incorporating 20% by weight of calcium carbonate [Shiraishi Calcium's Softon 1800] (mean particle size = 1.2 μm) in a mixture of 70% by weight of propylene homopolymer [Japan Polychem's Novatec PP:FY4] (MFR (230° C., 2.16 kg load) = 5 g/10 min, melting point = 165° C.) and 10% by weight of high-density polyethylene [Japan Polychem's Novatec HD:HJ360] (MFR (190° C., 2.16 kg load) = 5 g/10 min, melting point = 131° C.), followed by kneading the resulting composition in an extruder set at a temperature of 230° C. |
| Thermoplastic Resin (c) | Thermoplastic resin composition prepared by incorporating 30% by weight of calcium carbonate [Shiraishi Calcium's Softon 1800] (mean particle size = 1.2 μm) in 70% by weight of propylene homopolymer [Japan Polychem's Novatec PP:MA3] (MFR (230° C., 2.16 kg load) = 11 g/10 min, melting point = 165° C.) followed by kneading the resulting composition in an extruder set at a temperature of 230° C. |
| Thermoplastic Resin (d) | Thermoplastic resin composition prepared by incorporating 40% by weight of calcium carbonate [Shiraishi Calcium's Softon 1800] (mean particle size = 1.2 μm) in 60% by weight of propylene homopolymer [Japan Polychem's Novatec PP:MA3] (MFR (230° C., 2.16 kg load) = 11 g/10 min, melting point = 165° C.) followed by kneading the resulting composition in an extruder set at a temperature of 230° C. |
| Thermoplastic Resin (e) | Thermoplastic resin composition prepared by incorporating 60% by weight of calcium carbonate [Shiraishi Calcium's Softon 1800] (mean particle size = 1.2 μm) in 40% by weight of propylene homopolymer [Japan Polychem's Novatec PP:MA3] (MFR (230° C., 2.16 kg load) = 11 g/10 min, melting point = 165° C.) followed by kneading the resulting composition in an extruder set at a temperature of 230° C. |
| Thermoplastic Resin (f) | Propylene/ethylene copolymer [Japan Polychem's Novatec PP:FX4] (MFR (230° C., 2.16 kg load) = 6 g/10 min, melting point = 136° C.). |

Production Example 1 for Resin Film Layer (A)

The thermoplastic resin (b) and the thermoplastic resin (f) shown in Table 1 above were separately kneaded in three extruders set at 230° C., and then fed into an extrusion die set at 250° C., the resins were laminated in the die, and the resulting laminate was sheetwise extruded, and cooled with a cooling unit to thereby obtain an unstretched sheet having a layer of the thermoplastic resin (f) on both surfaces of a layer of the thermoplastic resin (b). The unstretched sheet was heated to 150° C. and stretched fourfold in the lengthwise direction. Next, the fourfold-stretched sheet was cooled to 60° C., then using a tenter oven, this was again heated to about 145° C. and stretched eightfold in the lateral direction, and thereafter heat treatment in a heat-setting zone conditioned at 160° C. was carried out. Subsequently, this was cooled to 60° C., then processed for corona discharge treatment on one side thereof, and trimmed to cut off the deckle edges thereof, thereby giving a three-layered [5/40/5 μm: stretched layer constitution (biaxial/biaxial/biaxial)], 50 μm-thick white film.

Production Example 2 for Resin Film Layer (A)

The thermoplastic resin (a) was kneaded in an extruder set at 230° C., then fed into an extrusion die set at 250° C. and sheetwise extruded, and this was cooled with a cooling unit to obtain an unstretched sheet. The unstretched sheet was heated to 135° C. and stretched fivefold in the lengthwise direction. The thermoplastic resin (c) was kneaded in an extruder set at 250° C. and then sheetwise extruded and laminated on the surface and the back surface of the above-prepared fivefold-stretched film, thereby obtaining a three-layered laminate film. Next, the three-layered laminate film was cooled to 60° C., then using a tenter oven, this was again heated to about 150° C. and stretched 8.5-fold in the lateral direction, and thereafter heat treatment in a heat-setting zone conditioned at 160° C. was carried out. Subsequently, this was cooled to 60° C., then processed for corona discharge treatment on one side thereof; and trimmed to cut off the decide edges thereof; thereby obtaining a three-layered [10/40/10 μm: stretched layer constitution (monoaxial/biaxial/monoaxial)], 60 μm-thick white film.

Production Example 3 for Resin Film Layer (A)

The thermoplastic resin (b) was kneaded in an extruder set at 230° C., then fed into an extrusion die set at 250° C. and sheetwise extruded, and this was cooled with a cooling unit to obtain an unstretched sheet. The unstretched sheet was heated to 140° C. and stretched 4.5-fold in the lengthwise direction. The thermoplastic resin (a) was kneaded in an extruder set at 250° C. and then sheetwise extruded and laminated on the surface and the back surface of the above-prepared 4.5-fold-stretched film, thereby obtaining a three-layered laminate film. Next, the three-layered laminate film was cooled to 60° C., then using a tenter oven, this was again heated to about 135° C. and stretched eightfold in the lateral direction, and thereafter heat treatment in a heat-setting zone conditioned at 160° C. was carried out. Subsequently, this was cooled to 60°

C., then processed for corona discharge treatment on one side thereof, and trimmed to cut off the deckle edges thereof, thereby giving a three-layered [10/50/10 μm: stretched layer constitution (monoaxial/biaxial/monoaxial)], 70 μm-thick white film.

Production Example 4 for Resin Film Layer (A)

The thermoplastic resin (c) was kneaded in an extruder set at 230° C., then fed into an extrusion die set at 250° C. and sheetwise extruded, and this was cooled with a cooling unit to obtain an unstretched sheet. The unstretched sheet was heated to 150° C. and stretched fourfold in the lengthwise direction. The thermoplastic resin (f) was kneaded in an extruder set at 250° C. and then sheetwise extruded and laminated on the surface and the back surface of the above-prepared fourfold-stretched film, thereby obtaining a three-layered laminate film. Next, the three-layered laminate film was cooled to 60° C., then using a tenter oven, this was again heated to about 145° C. and stretched sevenfold in the lateral direction, and thereafter heat treatment in a heat-setting zone conditioned at 160° C. was carried out. Subsequently, this was cooled to 60° C., then processed for corona discharge treatment on one side thereof; and trimmed to cut off the deckle edges thereof; thereby obtaining a three-layered [30/140/30 μm: stretched layer constitution (monoaxial/biaxial/monoaxial)], 200 μm-thick white film.

Production Example 5 for Resin Film Layer (A)

The thermoplastic resin (c) was kneaded in an extruder set at 230° C., then fed into an extrusion die set at 250° C. and sheetwise extruded, and this was cooled with a cooling unit to obtain an unstretched sheet. The unstretched sheet was heated to 150° C. and stretched fourfold in the lengthwise direction. The thermoplastic resin (e) was kneaded in an extruder set at 250° C. and then sheetwise extruded and laminated on the surface and the back surface of the above-prepared fourfold-stretched film, thereby obtaining a three-layered laminate film. Next, the three-layered laminate film was cooled to 60° C., then using a tenter oven, this was again heated to about 145° C. and stretched eightfold in the lateral direction, and thereafter heat treatment in a heat-setting zone conditioned at 160° C. was carried out. Subsequently, this was cooled to 60° C., then processed for corona discharge treatment on one side thereof, and trimmed to cut off the deckle edges thereof; thereby obtaining a three-layered [20/60/20 μm: stretched layer constitution (monoaxial/biaxial/monoaxial)], 100 μm-thick white film.

Production Example 6 for Resin Film Layer (A)

A 50 μm-thick white film having the same constitution as in Production Example 1 was obtained, for which, however, the three-layered film was processed for corona discharge treatment on both sides thereof.

Production Example 7 for Resin Film Layer (A)

The thermoplastic resin composition (a) and the thermoplastic resin composition (b) were separately kneaded in three extruders set at 230° C., and then fed into an extrusion die set at 250° C., the resins were laminated in the die, and the resulting laminate was sheetwise extruded, and cooled with a cooling unit to thereby obtain an unstretched sheet. The unstretched sheet was heated to 145° C. and stretched 4.5-fold in the lengthwise direction. Next, the 4.5-fold-stretched sheet was cooled to 60° C., then using a tenter oven, this was again heated to about 150° C. and stretched eightfold in the lateral direction, and thereafter heat treatment in a heat-setting zone conditioned at 160° C. was carried out. Subsequently, this was cooled to 60° C., then processed for corona discharge surface treatment on one side thereof, and trimmed to cut off the deckle edges thereof; thereby obtaining a three-layered [5/30/5 μm: stretched layer constitution (biaxial/biaxial/biaxial)], 40 μm-thick resin film layer (A).

Production Example 8 for Resin Film Layer (A)

The thermoplastic resin composition (b) was kneaded in an extruder set at 230° C., then fed into an extrusion die set at 250° C. and sheetwise extruded, and this was cooled with a cooling unit to obtain an unstretched sheet. The unstretched sheet was heated to 140° C. and stretched 4.5-fold in the lengthwise direction. The thermoplastic resin composition (c) was kneaded in an extruder set at 250° C. and then sheetwise extruded and laminated on the surface and the back surface of the above-prepared 4.5-fold-stretched film, thereby obtaining a three-layered laminate film. Next, the three-layered laminate film was cooled to 60° C., then using a tenter oven, this was again heated to about 150° C. and stretched eightfold in the lateral direction, and thereafter heat treatment in a heat-setting zone conditioned at 160° C. was carried out. Subsequently, this was cooled to 60° C., then processed for corona discharge treatment on one side thereof, and trimmed to cut off the deckle edges thereof thereby obtaining a three-layered [10/30/10 μm: stretched layer constitution (monoaxial/biaxial/monoaxial)], 50 μm-thick resin film layer (A).

Production Example 9 for Resin Film Layer (A)

The thermoplastic resin composition (c) was kneaded in an extruder set at 230° C., then fed into an extrusion die set at 250° C. and sheetwise extruded, and this was cooled with a cooling unit to obtain an unstretched sheet. The unstretched sheet was heated to 150° C. and stretched fourfold in the lengthwise direction. The thermoplastic resin composition (d) was kneaded in an extruder set at 250° C. and then sheetwise extruded and laminated on the surface and the back surface of the above-prepared fourfold-stretched film, thereby obtaining a three-layered laminate film. Next, the three-layered laminate film was cooled to 60° C., then using a tenter oven, this was again heated at about 150° C. and stretched ninefold in the lateral direction, and thereafter heat treatment in a heat-setting zone conditioned at 160° C. was carried out. Subsequently, this was cooled to 60° C., then processed for corona discharge treatment on one side thereof, and trimmed to cut off the deckle edges thereof; thereby giving a three-layered [10/60/10 μm: stretched layer constitution (monoaxial/biaxial/monoaxial)], 80 μm-thick resin film layer (A).

Production Example 10 for Resin Film Layer (A)

The thermoplastic resin composition (a) was kneaded in an extruder set at 230° C., then fed into an extrusion die set at 250° C. and sheetwise extruded, and this was cooled with a cooling unit to obtain an unstretched sheet. The unstretched sheet was heated to 155° C. and stretched 3.5-fold in the lengthwise direction. The thermoplastic resin composition (a) was kneaded in an extruder set at 250° C. and then sheetwise extruded and laminated on the surface and the back surface of the above-prepared 3.5-fold-stretched film, thereby giving a three-layered laminate film. Next, the three-layered laminate film was cooled to 60° C., then using a tenter oven, this was again heated to about 155° C. and stretched sevenfold in the lateral direction, and thereafter heat treatment in a heat-setting zone conditioned at 160° C. was carried out. Subsequently, this was cooled to 60° C., then processed for corona discharge treatment on one side thereof, and trimmed to cut off the deckle edges thereof, thereby obtaining a three-layered [10/40/10 μm: stretched layer constitution (monoaxial/biaxial/monoaxial)], 60 μm-thick resin film layer (A).

Production Example 11 for Resin Film Layer (A)

The thermoplastic resin composition (b) was kneaded in an extruder set at 230° C., then fed into an extrusion die set at 250° C. and sheetwise extruded, and this was cooled with a cooling unit to obtain an unstretched sheet. The unstretched sheet was heated to 135° C. and stretched fourfold in the lengthwise direction. The thermoplastic resin composition (d) was kneaded in an extruder set at 250° C. and then sheetwise extruded and laminated on the surface and the back surface of the above-prepared fourfold-stretched film, thereby obtaining a three-layered laminate film. Next, the three-layered laminate film was cooled to 60° C., then using a tenter oven, this was again heated to about 150° C. and stretched ninefold in the lateral direction, and thereafter heat treatment in a heat-setting zone conditioned at 160° C. was carried out. Subsequently, this was cooled to 60° C., then processed for corona discharge treatment on one side thereof, and trimmed to cut off the deckle edges thereof; thereby obtaining a three-layered [30/80/30 μm: stretched layer constitution (monoaxial/biaxial/monoaxial)], 140 μm-thick resin film layer (A).

Production Example 12 for Resin Film Layer (A)

The thermoplastic resin composition (d) was kneaded in an extruder set at 230° C., then fed into an extrusion die set at 250° C. and sheetwise extruded, and this was cooled with a cooling unit to obtain an unstretched sheet. The unstretched sheet was heated to 145° C. and stretched fourfold in the lengthwise direction. The thermoplastic resin composition (e) was kneaded in an extruder set at 250° C. and then sheetwise extruded and laminated on the surface and the back surface of the above-prepared fourfold-stretched film, thereby obtaining a three-layered laminate film. Next, the three-layered laminate film was cooled to 60° C., then using a tenter oven, this was again heated to about 140° C. and stretched eightfold in the lateral direction, and thereafter heat treatment in a heat-setting zone conditioned at 160° C. was carried out. Subsequently, this was cooled to 60° C., then processed for corona discharge treatment on one side thereof, and trimmed to cut off the deckle edges thereof, thereby obtaining a three-layered [15/50/15 μm: stretched layer constitution (monoaxial/biaxial/monoaxial)], 80 μm-thick resin film layer (A).

Production Example 13 for Resin Film Layer (A)

The thermoplastic resin composition (a) was kneaded in an extruder set at 230° C., then fed into an extrusion die set at 250° C. and sheetwise extruded, and this was cooled with a cooling unit to obtain an unstretched sheet. The unstretched sheet was heated to 145° C. and stretched 4.5-fold in the lengthwise direction. The thermoplastic resin composition (b) was kneaded in an extruder set at 250° C. and then sheetwise extruded and laminated on the surface and the back surface of the above-prepared 4.5-fold-stretched film, thereby giving a three-layered laminate film. Next, the three-layered laminate film was cooled to 60° C., then using a tenter oven, this was again heated to about 150° C. and stretched eightfold in the lateral direction, and thereafter heat treatment in a heat-setting zone conditioned at 160° C. was carried out. Subsequently, this was cooled to 60° C., then processed for corona discharge treatment on one side thereof; and trimmed to cut off the decide edges thereof, thereby obtaining a three-layered [3/24/3 μm: stretched layer constitution (biaxial/biaxial/biaxial)], 30 μm-thick resin film layer (A).

The physical properties of the resin film layers (A) produced in Production Examples are shown collectively in Table 2. In Table 2, the porosity (%) indicates the percentage of the voids relative to the whole resin film layer (A).

TABLE 2

| | | Film Constitution | | | Measurement Result of Physical Properties | | |
|---|---|---|---|---|---|---|---|
| | | Stretching Constitution | Resins Used | Thickness μm (each layer) | Porosity % | Gurley Softness (mgf) MD | TD |
| Production Example | 1 | biaxial/biaxial/biaxial | f/b/f | 50 (5/40/5) | 15 | 15.2 | 23.7 |
| | 2 | monoaxial/biaxial/monoaxial | c/a/c | 60 (10/40/10) | 22 | 13.7 | 29.0 |
| | 3 | monoaxial/biaxial/monoaxial | a/b/a | 70 (10/50/10) | 29 | 20.7 | 46.5 |
| | 4 | monoaxial/biaxial/monoaxial | f/c/f | 200 (30/140/30) | 31 | 490.0 | 911.0 |
| | 5 | monoaxial/biaxial/monoaxial | e/c/e | 100 (20/60/20) | 51 | 62.1 | 125.7 |
| | 6 | biaxial/biaxial/biaxial | f/b/f | 50 (5/40/5) | 15 | 15.2 | 23.7 |
| | 7 | biaxial/biaxial/biaxial | b/a/b | 40 (5/30/5) | 13 | 5.5 | 11.3 |
| | 8 | monoaxial/biaxial/monoaxial | c/b/c | 50 (10/30/10) | 29 | 7.9 | 16.1 |
| | 9 | monoaxial/biaxial/monoaxial | d/c/d | 80 (10/60/10) | 37 | 28.2 | 57.8 |
| | 10 | monoaxial/biaxial/monoaxial | a/a/a | 60 (10/40/10) | 3 | 21.0 | 45.3 |
| | 11 | monoaxial/biaxial/monoaxial | d/b/d | 140 (30/80/30) | 26 | 170.7 | 284.2 |
| | 12 | monoaxial/biaxial/monoaxial | e/d/e | 80 (15/50/15) | 57 | 12.0 | 27.3 |
| | 13 | biaxial/biaxial/biaxial | b/a/b | 30 (3/24/3) | 12 | 2.2 | 4.8 |

The materials used in Examples of the present invention and Comparative Examples are shown collectively in Table 3.

TABLE 3

| Material | Content |
|---|---|
| Peelable Layer Example 1 | The ingredients were incorporated so as to have the concentration mentioned below after drying, thereby preparing an adhesive coating composition.<br>Polyether urethane adhesive 55 wt. %<br>[Toyo Morton's TM-317]<br>Isocyanate curing agent 45 wt. %<br>[Toyo Morton's CAT-11B]<br>The prepared coating composition was diluted with ethyl acetate to have a solid concentration of 25 wt. %. |
| Peelable Layer Example 2 | The ingredients were incorporated so as to have the concentration mentioned below after drying, thereby preparing an adhesive coating composition.<br>Acrylic adhesive 90 wt. %<br>[Toagosei's Aron S-1017]<br>Isocyanate curing agent 10 wt. %<br>[Nippon Polyurethane Industry's Coronate HL]<br>The prepared coating composition was diluted with toluene to have a solid concentration of 25 wt. %. |
| Peelable Layer Example 3 | The ingredients were incorporated so as to have the concentration mentioned below after drying, thereby preparing an adhesive coating composition.<br>Polyether urethane adhesive 40 wt. %<br>[Toyo Morton's TM-317]<br>Isocyanate curing agent 60 wt. %<br>[Toyo Morton's CAT-11B]<br>The prepared coating composition was diluted with ethyl acetate to have a solid concentration of 25 wt. %. |
| Peelable Layer Example 4 | The ingredients were incorporated so as to have the concentration mentioned below after drying, thereby preparing an adhesive coating composition.<br>Polyester adhesive 85 wt. %<br>[Toyobo's Vylon GK-640]<br>Isocyanate curing agent 15 wt. %<br>[Nippon Polyurethane Industry's Coronate HL]<br>The prepared coating composition was diluted with a mixed liquid of MEK/ethyl acetate = 1/1 to have a solid concentration of 25 wt. %. |
| Support Layer Example 1 | Unstretched PP film having a thickness of 50 μm and a Gurley softness of 1.7 mgf in MD and 1.5 mgf in TD, and having an Anti-Static property on one side thereof [Futamura Chemical's FCMN-AS] was processed for corona discharge surface treatment on the other surface thereof than that having the Anti-Static property, thereby enhancing the adhesiveness thereof to the peelable layer. |
| Support Layer Example 2 | Light-coated paper having a unit weight of 104.7 g/m², a thickness of 130 μm and a Gurley softness of 15.3 mgf in MD and 6.9 mgf in TD [Oji Paper's OK Star Light Coat]. |
| Support Layer Example 3 | Stretched PET film having a thickness of 38 μm, and a Gurley softness of 11.6 mgf in MD and 14.5 mgf in TD [Mitsubishi Plastics's T300]. |
| Support Layer Example 4 | PP-made synthetic paper having a thickness of 80 μm, and a Gurley softness of 32.5 mgf in MD and 66.6 mgf in TD [Yupo Corporation's FPG80]. |
| Support Layer Example 5 | PET film having a thickness of 100 μm, and a Gurley softness of 243.3 mgf in MD and 287.2 mgf in TD [Mitsubishi Plastics's O300]. |

Production Example 1 for Recording Layer (D)

A polyamide epichlorohydrin adduct resin solution (Seiko PMC's trade name, WS4002) was diluted with water to control the solid content to 1%, thereby preparing a coating solution for a recording layer.

The coating solution was applied onto one surface (discharge-treated surface) of the resin film layer (A) of Production Examples 1 to 13 in such a manner that the dry solid content thereof could be 0.05 g/m², and thereafter this was dried at 80° C. for 5 minutes to form a label layer (i) having a recording layer (D).

Production Example 2 for Recording Layer (D)

15 parts by weight of 2-hydroxyethyl methacrylate, 50 parts by weight of methyl methacrylate, 35 parts by weight of ethyl acrylate and 100 parts by weight of toluene were put into a three-neck flask equipped with a stirrer, a reflux condenser and a thermometer, purged with nitrogen, and 0.6 parts by weight of 2,2'-azobisisobutyronitrile serving as an initiator was put thereinto, and polymerized at 80° C. for 4 hours. The obtained solution was a 50% toluene solution of hydroxyl group-having methacrylate polymer having a hydroxyl value of 65. Next, 30 parts by weight of a 20% methylethylketone solution of vinylchloride/vinyl acetate copolymer (Shin Dai-Ichi Vinyl Corporation's trade name, ZEST C150ML), 20 parts by weight of a 75% ethyl acetate solution of hexamethylene diisocyanate (Nippon Polyurethane Industry's trade name, Coronate HL) and 20 parts by weight of heavy calcium carbonate powder having a mean particle diameter of 1.5 μm (Bihoku Funka Kogyo's trade name, Softon 1500) were incorporated in 100 parts by weight of the solution. Butyl acetate was added to the mixture to control the solid content to 35%, thereby preparing a coating solution for a recording layer.

The coating solution was applied onto one surface (discharge-treated surface) of the resin film layer (A) of Production Examples 1, 7 to 9 in such a manner that the dry solid content thereof could be 2 g/m², and thereafter this was dried at 80° C. for 60 minutes to form a label layer (i) having a recording layer.

Production Example 3 for Recording Layer (D)

The coating solution prepared in Production Example 2 for Recording Layer was applied onto a 12 μm-thick polyethylene terephthalate film (Toyobo's trade name, Espet Film E5100) in such a manner that the dry solid content thereof could be 2 g/m², and thereafter this was cured at 80° C. for 60 minutes to form a recording layer film having a coating layer. The coating composition of Peelable Layer Example 1 was applied onto one surface (discharge-treated surface) of the resin film layer (A) of Production Examples 1, 2, 7 and 8 in such a manner that the dry coating amount thereof could be 3 g/m², and thereafter this was dried at 40° C. for 1 minute, and then the recording layer film was attached to thereby form a label layer (i) having a recording layer (D).

[Electrically Charging Treatment]

As examples of electrically charging treatment, the following three treatments were employed in the Examples.

[Electrically Charging Treatment A]

Figure 3:
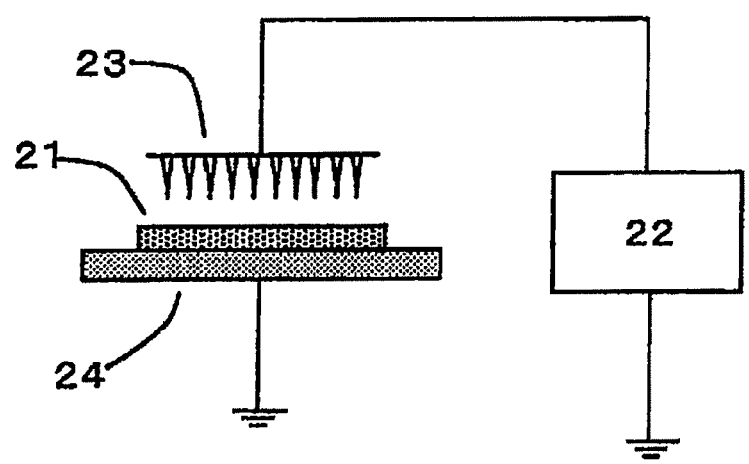
FIG. 3 It is an example of a direct-current corona-discharging apparatus for use in charging treatment in the present invention.

The treatment was carried out by applying a voltage of 20 KV for 5 seconds, using the direct-current corona-discharging apparatus shown in FIG. 3.

[Electrically Charging Treatment B]

The treatment was carried out using an alternate-current corona surface treatment apparatus (by Kasuga Electric), at a power density of 50 W/m².

[Peeling Charging]

The electrically charging treatment was not by charge injection but by a peeling charging alone between the label layer (i) and the peelable sheet (ii) from each other.

Examples 1 to 20 and Comparative Examples 2 to 3, and Comparative Example 5

The lamination method for Examples 1 to 20 of the present invention and Comparative Examples 2 to 3 and Comparative Example 5, and the evaluation results based on Test Examples mentioned below are shown collectively in Table 4. The electrostatic adsorbable sheets (iii) of Examples and Comparative Examples were produced, using the materials in the above-mentioned Production Examples and Table 3 and according to the process mentioned below. The coating composition of Peelable Layer Examples was applied to the label layer (i) onto the surface thereof not coated with the recording layer (D) in such a manner that the coating amount thereof after dried could be the coating amount shown in Table 4, and then dried at 40° C. for 1 minute; and then, the peelable sheet (ii) was attached thereto, and processed for electrically charging treatment as shown in Table 4 thereby producing the electrostatic adsorbable sheet (iii).

Comparative Example 1

A laminate film was produced according to the same lamination method as in Example 1, in which, however, the recording layer (D) was not provided on the resin film layer (A).

Comparative Example 4

A laminate film was produced according to the same lamination method as in Example 1, in which, however, the peelable layer (B) and the support layer (C) were not provided.

TABLE 4

| | | Layer Constitution | | | | Thickness of Layer B (μm) | Gurley Softness (mgf) | | | | | | Ratio of (ii)/(i) | |
|---|---|---|---|---|---|---|---|---|---|---|---|---|---|---|
| | | Recording Layer (D) | Resin Film Layer (A) | Peelable Layer (B) | Support Layer (C) | | Label Layer (i) | | Peelable Sheet Layer (ii) | | | | | |
| | | | | | | | MD | TD | MD | TD | | | MD | TD |
| Example | 1 | Recording Layer Example 1 | Production Example 1 | Peelable Layer Example 1 | Support Layer Example 1 | 2 | 15.2 | 23.7 | 1.7 | 1.5 | | | 0.11 | 0.06 |
| | 2 | Recording Layer Example 1 | Production Example 2 | Peelable Layer Example 1 | Support Layer Example 1 | 5 | 13.7 | 29 | 1.9 | 1.6 | | | 0.14 | 0.06 |
| | 3 | Recording Layer Example 1 | Production Example 3 | Peelable Layer Example 1 | Support Layer Example 1 | 2 | 20.7 | 46.5 | 1.8 | 1.6 | | | 0.09 | 0.03 |
| | 4 | Recording Layer Example 1 | Production Example 4 | Peelable Layer Example 2 | Support Layer Example 2 | 5 | 490 | 911 | 1.8 | 1.5 | | | 0.004 | 0.002 |
| | 5 | Recording Layer Example 1 | Production Example 1 | Peelable Layer Example 2 | Support Layer Example 2 | 25 | 16.7 | 25.6 | 20 | 9.5 | | | 1.20 | 0.37 |
| | 6 | Recording Layer Example 3 | Production Example 2 | Peelable Layer Example 2 | Support Layer Example 1 | 1 | 38.7 | 69.7 | 15.6 | 6.8 | | | 0.40 | 0.10 |
| | 7 | Recording Layer Example 3 | Production Example 1 | Peelable Layer Example 1 | Support Layer Example 1 | 7 | 44.9 | 82.2 | 1.8 | 1.6 | | | 0.04 | 0.02 |
| | 8 | Recording Layer Example 1 | Production Example 7 | Peelable Layer Example 3 | Support Layer Example 1 | 2 | 5.5 | 11.3 | 1.8 | 1.6 | | | 0.33 | 0.14 |
| | 9 | Recording Layer Example 1 | Production Example 8 | Peelable Layer Example 4 | Support Layer Example 1 | 3 | 7.9 | 16.1 | 1.9 | 1.7 | | | 0.24 | 0.11 |
| | 10 | Recording Layer Example 1 | Production Example 9 | Peelable Layer Example 4 | Support Layer Example 3 | 5 | 28.2 | 57.8 | 14.3 | 17.6 | | | 0.51 | 0.30 |
| | 11 | Recording Layer Example 1 | Production Example 10 | Peelable Layer Example 3 | Support Layer Example 3 | 10 | 21.0 | 45.3 | 17.5 | 21 | | | 0.83 | 0.46 |
| | 12 | Recording Layer Example 1 | Production Example 11 | Peelable Layer Example 4 | Support Layer Example 4 | 10 | 170.7 | 284.2 | 37.9 | 78.9 | | | 0.22 | 0.28 |
| | 13 | Recording Layer Example 2 | Production Example 7 | Peelable Layer Example 3 | Support Layer Example 1 | 5 | 6.1 | 13.6 | 2 | 1.7 | | | 0.33 | 0.13 |
| | 14 | Recording Layer Example 1 | Production Example 8 | Peelable Layer Example 3 | Support Layer Example 1 | 10 | 8.4 | 17.5 | 2.3 | 1.9 | | | 0.27 | 0.11 |
| | 15 | Recording Layer Example 2 | Production Example 9 | Peelable Layer Example 3 | Support Layer Example 1 | 25 | 30.4 | 61.2 | 3.4 | 2.9 | | | 0.11 | 0.05 |
| | 16 | Recording Layer Example 3 | Production Example 7 | Peelable Layer Example 3 | Support Layer Example 3 | 2 | 21.5 | 44.1 | 13 | 15.5 | | | 0.60 | 0.35 |
| | 17 | Recording Layer Example 3 | Production Example 8 | Peelable Layer Example 3 | Support Layer Example 3 | 5 | 28.8 | 56.8 | 14.6 | 17 | | | 0.51 | 0.30 |
| | 18 | Recording Layer Example 1 | Production Example 2 | Peelable Layer Example 5 | Support Layer Example 1 | 10 | 13.4 | 38.8 | 413.9 | 199.5 | | | 30.89 | 5.14 |
| | 19 | Recording Layer Example 1 | Production Example 9 | Peelable Layer Example 3 | Support Layer Example 1 | 3 | 28.2 | 57.8 | 243 | 293.4 | | | 8.62 | 5.08 |
| | 20 | Recording Layer Example 1 | Production Example 13 | Peelable Layer Example 3 | Support Layer Example 3 | 2 | 2.2 | 4.8 | 12.7 | 15.1 | | | 5.77 | 3.15 |
| Comparative Example | 1 | none | Production Example 1 | Peelable Layer Example 1 | Support Layer Example 1 | 2 | 15.2 | 23.6 | 1.7 | 1.6 | | | 0.11 | 0.07 |
| | 2 | Recording Layer Example 1 | Production Example 5 | Peelable Layer Example 2 | Support Layer Example 1 | 12 | 62.1 | 125.7 | 2 | 1.7 | | | 0.03 | 0.01 |
| | 3 | Recording Layer Example 1 | Production Example 6 | Peelable Layer Example 1 | Support Layer Example 1 | 18 | 9.5 | 20.4 | 2.2 | 1.8 | | | 0.23 | 0.09 |
| | 4 | Recording Layer Example 1 | Production Example 1 | none | none | — | 15.2 | 23.7 | — | — | | | — | — |
| | 5 | Recording Layer Example 1 | Production Example 12 | Peelable Layer Example 3 | Support Layer Example 1 | 5 | 12.0 | 27.3 | 2 | 1.8 | | | 0.17 | 0.07 |

| | | Surface Resistivity (Ω) | | Contact Angle with Water of Recording Layer (D) | Peeling | | Water Vapor Permeability of Label Layer (i) g·mm/m²·24 hr | Evaluation Item | | | | | |
|---|---|---|---|---|---|---|---|---|---|---|---|---|---|
| | | Recording Layer (D) | Support Layer (C) | | Electrically Charging Treatment | Strength g/cm | Blocking g/cm | | Ink Adhesiveness | Clipping Aptitude | Label Handlability | Paper Alignment | Peelability | Durability of Adsorbability |
| Example | 1 | 7.E+14 | 5.E+10 | 73 | A | 12 | 12 | 0.48 | ○ | ○ | △ | ○ | ⊙ | ○ |
| | 2 | 2.E+13 | 5.E+10 | 76 | A | 23 | 9 | 0.54 | ○ | ○ | ○ | ○ | ⊙ | ○ |
| | 3 | 3.E+13 | 5.E+10 | 73 | A | 16 | 10 | 0.78 | ○ | ○ | △ | ○ | ⊙ | ○ |
| | 4 | 1.E+14 | 5.E+10 | 72 | B | 36 | 13 | 0.90 | ○ | ○ | △ | ○ | ○ | ○ |
| | 5 | 4.E+14 | 3.E+11 | 84 | A | 45 | 8 | 0.52 | ○ | ○ | ○ | ○ | ⊙ | ○ |
| | 6 | 4.E+14 | 3.E+11 | 85 | A | 10 | 9 | 0.49 | ○ | ○ | ○ | ○ | ○ | ○ |
| | 7 | 6.E+14 | 5.E+10 | 85 | A | 15 | 4 | 0.57 | ○ | ○ | ○ | ○ | ⊙ | ○ |
| | 8 | 9.E+13 | 1.E+12 | 73 | peeling charging | 5 | | 0.29 | | | | | | |

TABLE 4-continued

| | | | | | | | | | | | | | |
|---|---|---|---|---|---|---|---|---|---|---|---|---|---|
| 9 | 2.E+14 | 1.E+12 | 75 | peeling charging | 4 | 3 | 0.34 | ○ | ○ | ○ | ○ | ⊙ | ○ |
| 10 | 6.E+14 | 2.E+15 | 74 | peeling charging | 4 | 6 | 0.50 | ○ | ○ | ○ | △ | ⊙ | ○ |
| 11 | 9.E+14 | 2.E+15 | 74 | peeling charging | 7 | 9 | 0.31 | ○ | ○ | ○ | △ | ⊙ | ○ |
| 12 | 6.E+14 | 2.E+10 | 72 | peeling charging | 5 | 7 | 0.29 | ○ | ○ | ○ | ○ | ⊙ | ○ |
| 13 | 8.E+13 | 1.E+12 | 84 | peeling charging | 7 | 5 | 0.30 | ○ | ○ | ○ | ○ | ⊙ | ○ |
| 14 | 9.E+14 | 1.E+12 | 85 | peeling charging | 5 | 4 | 0.33 | ○ | ○ | ○ | ○ | ⊙ | ○ |
| 15 | 5.E+14 | 1.E+12 | 84 | peeling charging | 3 | 4 | 0.49 | ○ | ○ | ○ | △ | ⊙ | ○ |
| 16 | 8.E+15 | 2.E+15 | 86 | peeling charging | 3 | 2 | 0.32 | ○ | ○ | ○ | △ | ○ | ○ |
| 17 | 5.E+15 | 2.E+15 | 84 | peeling charging | 3 | 2 | 0.36 | ○ | ○ | ○ | △ | △ | ○ |
| 18 | 7.E+13 | 1.E+14 | 76 | A | 19 | 10 | 0.54 | ○ | ○ | △ | △ | △ | △ |
| 19 | 5.E+14 | 2.E+15 | 74 | peeling charging | 5 | 7 | 0.50 | ○ | ○ | ○ | △ | ⊙ | ○ |
| 20 | 6.E+14 | 2.E+15 | 77 | peeling charging | 7 | 7 | 0.31 | ○ | ○ | ○ | ○ | ⊙ | ○ |
| Comparative Example 1 | 4.E+15 | 5.E+10 | 72 | A | 14 | 12 | 0.48 | × | ○ | △ | ○ | × | △ |
| 2 | 8.E+14 | 5.E+10 | 73 | A | 170 | 9 | 3.25 | ○ | ○ | ○ | ○ | △ | ○ |
| 3 | 1.E+13 | 5.E+10 | 64 | A | 260 | 11 | 0.49 | ○ | ○ | ○ | × | × | × |
| 4 | 7.E+14 | — | 73 | A | — | — | — | ○ | ○ | ○ | ○ | ○ | ○ |
| 5 | 3.E+13 | 1.E+12 | 75 | peeling charging | 76 | 3 | 8.16 | ○ | ○ | ○ | ○ | × | × |

Test Examples

Ink Adhesiveness

The electrostatic adsorbable sheet (iii) was stored in an atmosphere at a temperature of 23° C. and at a relative humidity of 50% for 1 day. Using a printer "RI-III Model Printability Tester" (trade name by Akari Seisakusho) with a printing ink "Bestcure 161 (black)" (T&K TOKA's trade name), the electrostatic adsorbable sheet (iii) was printed on the recording layer (D) thereof to a thickness of 1.5 g/m². Irradiated with UV from a metal halide lamp by Eye Graphics (80 W/cm) at a UV radiation intensity of 0.04 W/cm², this was again stored in an atmosphere at a temperature of 23° C. and at a relative humidity of 50% for 1 day. Using an adhesion strength tester "Internal Bond Tester" (Kumagai Riki Kogyo's trade name), the ink adhesion strength was measured. The samples of which the adhesion strength is at least 1.0 kg·cm were evaluated as good.

○ (good): The adhesion strength is 1.0 kg·cm or more.

X (not good): The adhesion strength is less than 1.0 kg·cm.

Clipping Aptitude

The electrostatic adsorbable sheet (iii) was cut into a size A5. Using a rotary die cutter, plane cutting tool "R.D.C" (Tsukatani Hamono Manufacturing's trade name) and "Pinnacle Die" (by Tsukatani Hamono Manufacturing), the center part of the A5-size sheet was half-cut in a size of 89 mm length×57 mm width. This was tested as to whether or not its label layer (i) alone could be clipped out, and evaluated according to the following criteria.

○ (good): The label layer (i) alone could be clipped out.

X (not good): The peelable sheet layer (ii) was cut together.

Label Handlability

The peripheral part of the label layer of the half-cut electrostatic adsorbable sheet (iii) that had been prepared in the clipping aptitude test was peeled. 100 samples of the electrostatic adsorbable sheet (iii) having a part without the label layer (i) and a part with the label layer (i) remained were prepared. These were piled up and stored in an environment at a temperature of 40° C. and a humidity of 80%, and thereafter tested for the handlability with hand.

○ (good): 100 samples all did not attach and were well handled.

Δ (slightly good): Less than 50 samples attached together.

X (not good): At least 50 samples attached together.

Paper Alignment

The electrostatic adsorbable sheet (iii) was blanked out with a blanking die to a size of 89 mm length×57 mm width, and 100 cards of the type were prepared. The thus-prepared cards were randomly spread on a glass plate having a size of 1 m×1 m, and collected with hand to form a stack of 100 cards. The thus-collected cards were checked as to whether or not they could be bundled in good order.

◉: Good. (A bundle in which for edges were aligned well was formed)

Δ: Slightly good. (A bundle was formed though their four edges could not be aligned well.)

X: Not good. (The cards attached to the glass plate and could not be bundled.)

Peelability

The electrostatic adsorbable sheet (iii) was peeled at the interface between the label layer (i) and the peelable sheet layer (ii), and the label layer (i) was checked for the curling state, shrinkage state and the presence or absence of the breakage. The sheet was evaluated according to the following criteria:

◉: Excellent. Neither curling nor shrinkage occurred.

○: Good. The label layer (i) shrunk by peeling, but did not curl.

Δ: Slightly good. The label layer (i) curled slightly but is usable as a label.

X: Not good. The label layer (i) curled cylindrically, or broke.

Dulability of Adsorbability

Ten samples of the label layer (i) of the electrostatic adsorbable sheet (iii) prepared in the clipping aptitude test were electrostatically adsorbed to a mirror-face aluminium plate, and the aluminium plate was stored while kept stood vertically in an environment at a temperature of 40° C. and a humidity of 80%. After one month, the samples were observed for their condition, and evaluated according to the following criteria:

○ (good): All the samples kept their original condition.

Δ (slightly good): At most one sample could not keep its original condition.

X (not good): Two or more samples could not keep their original condition.

While the present invention has been described in detail and with reference to specific embodiments thereof, it will be apparent to one skilled in the art that various changes and modifications can be made therein without departing from the spirit and scope of the present invention.

The present application is based on a Japanese patent application (No. 2008-156329) filed Jun. 16, 2008 and a Japanese patent application (No. 2009-115076) filed May 12, 2009, the entire contents thereof being hereby incorporated by reference.

INDUSTRIAL APPLICABILITY

The print recorded material comprising the electrostatic adsorbable sheet (iii) of the present invention is favorable for applications such as POP cards (poster, sticker, display, etc.), retail premises guides (pamphlet, company guide, list of goods, menu, etc.), mats (lunch mat, table mat, stationery, etc.), manuals (various manuals for duty assignment, work, operation, etc., process sheet, time schedule, etc.), charts (marine chart, weather map, graphic chart, ruled chart, etc.), catalogues, maps (marine map, route map, outdoor map, etc.), shop price lists, mountain climbing guides, visiting cards, lost child ID cards, cooking recipes, signboards (shop guide, direction/destination guide, etc.), schedule tables, road signs (for funeral/housing exhibition place, etc.), room identification cards, school record tables, signboards (for keep-out direction, forest road construction, etc.), compartment piles, doorplates, calendars (with image), simple whiteboards, mouse pads, packaging materials (packaging paper, box, bag, etc.), coasters, etc.

What is claimed is:

1. An electrostatic adsorbable sheet (iii) comprising:
a laminate of a label layer (i) containing a resin film layer (A) and a recording layer (D) on one surface of the resin film layer (A); and
a peelable sheet layer (ii) containing a peelable layer (B) and a support layer (C), wherein:

the label layer (i) and the peelable sheet layer (ii) are laminated so that the resin film layer (A) and the peelable layer (B) contact each other, the peeling strength between the label layer (i) and the peelable sheet layer (ii) is from 1 to 50 g/cm, the label layer (i) peeled from the peelable sheet layer (ii) is electrostatically adsorbable to an object to be attached, the peelable layer (B) covers the entire support layer (C) or resin film layer (A), and the resin film layer (A) contains at least one of a polyolefin resin and a polyolefin resin having a functional group.

2. The electrostatic adsorbable sheet (iii) as claimed in claim 1, wherein the laminate is subjected to an electrically charging treatment to introduce charges into the label layer (i).

3. The electrostatic adsorbable sheet (iii) as claimed in claim 2, wherein the electrically charging treatment is a peeling charging derived from the peeling of the peelable sheet layer (ii) and the label layer (i).

4. The electrostatic adsorbable sheet (iii) as claimed in claim 2, wherein the electrically charging treatment is a corona discharge treatment according to a high-voltage direct-current power source method.

5. The electrostatic adsorbable sheet (iii) as claimed in claim 2, wherein the electrically charging treatment is a corona discharge treatment according to a high-voltage alternate-current power source method.

6. The electrostatic adsorbable sheet (iii) as claimed in claim 1, wherein the resin film layer (A) contains from 3 to 70% by weight of at least one of an inorganic fine powder and an organic filler, and from 97 to 30% by weight of the at least one of a polyolefin resin and a polyolefin resin having a functional group.

7. The electrostatic adsorbable sheet (iii) as claimed in claim 1, wherein the resin film layer (A) contains a stretched resin film stretched in at least one axial direction and has a porosity, as computed according to the following formula (1), of from 1 to 70%

$$\text{Porosity (\%)} = [(\rho_o - \rho)/\rho_o] \times 100 \quad (1).$$

8. The electrostatic adsorbable sheet (iii) as claimed in claim 1, wherein the resin film layer (A) has a multilayer structure and contains a layer stretched in at least two axial directions.

9. The electrostatic adsorbable sheet (iii) as claimed in claim 1, wherein the peelable layer (B) is formed according to a coating method from at least one of an ether resin, an ester resin, a urethane resin, a urea resin, an acrylic resin, an amide resin, and an epoxy resin.

10. The electrostatic adsorbable sheet (iii) as claimed in claim 1, wherein the support layer (C) comprises any of a paper, a resin film or a synthetic paper.

11. The electrostatic adsorbable sheet (iii) as claimed in claim 1, wherein the surface resistivity of the support layer (C) is from $1 \times 10^{-1}$ to $9 \times 10^{12} \Omega$.

12. The electrostatic adsorbable sheet (iii) as claimed in claim 1, wherein the recording layer (D) contains a polymer binder.

13. The electrostatic adsorbable sheet (iii) as claimed in claim 1, wherein the surface resistivity of the recording layer (D) is from $1 \times 10^{13}$ to $9 \times 10^{17} \Omega$.

14. The electrostatic adsorbable sheet (iii) as claimed in claim 1, wherein the water vapor permeation coefficient of the label layer (i) is from 0.01 to 2.50 g·mm/(m²·24 hr).

15. The electrostatic adsorbable sheet (iii) as claimed in claim 1, wherein the ratio of the Gurley stiffness of the peelable sheet layer (ii) is from 0.04 to 0.95 when the Gurley stiffness of the label layer (i) is set as 1.

16. The electrostatic adsorbable sheet (iii) as claimed in claim 1, wherein the Gurley stiffness of the label layer (i) is from 5 to 1000 mgf, and the Gurley stiffness of the peelable sheet layer (ii) is from 1 to 500 mgf.

17. The electrostatic adsorbable sheet (iii) as claimed in claim 1, wherein the thickness of the label layer (i) is from 20 to 500 μm, and the thickness of the peelable sheet layer (ii) is from 1 to 500 μm.

18. A print recorded material comprising the electrostatic adsorbable sheet (iii) as claimed in claim 1.

19. A label comprising the label layer (i) which is obtained by peeling the peelable sheet layer (ii) from the print recorded material as claimed in claim 18.

20. An electrostatic adsorbable sheet (iii) comprising:
a laminate of a label layer (i) containing a resin film layer (A) and a recording layer (D) on one surface of the resin film layer (A); and
a peelable sheet layer (ii) containing a peelable layer (B) and a support layer (C), wherein:
the label layer (i) and the peelable sheet layer (ii) are laminated so that the resin film layer (A) and the peelable layer (B) contact each other,
the peeling strength between the label layer (i) and the peelable sheet layer (ii) is from 1 to 50 g/cm,
the label layer (i) peeled from the peelable sheet layer (ii) is electrostatically adsorbable to an object to be attached,
the peelable layer (B) covers the entire support layer (C) or resin film layer (A), and
the resin film layer (A) and the peelable layer (B) directly contact each other.

* * * * *